(12) United States Patent
McRae

(10) Patent No.: US 10,264,907 B2
(45) Date of Patent: Apr. 23, 2019

(54) TREE TRUNK HAVING ILLUMINATED CONNECTABLE TRUNK SECTIONS WITH LIGHT SOURCE DISPOSED

(71) Applicant: National Tree Company, Cranford, NJ (US)

(72) Inventor: Michael M. McRae, Ormond Beach, FL (US)

( * ) Notice: Subject to any disclaimer, the term of this patent is extended or adjusted under 35 U.S.C. 154(b) by 21 days.

(21) Appl. No.: 15/468,843

(22) Filed: Mar. 24, 2017

(65) Prior Publication Data

US 2018/0100958 A1 Apr. 12, 2018

Related U.S. Application Data

(60) Provisional application No. 62/406,132, filed on Oct. 10, 2016.

(51) Int. Cl.
*A47G 33/06* (2006.01)
*A47G 33/08* (2006.01)
(Continued)

(52) U.S. Cl.
CPC ............ *A47G 33/06* (2013.01); *A47G 33/08* (2013.01); *A47G 2033/0827* (2013.01);
(Continued)

(58) Field of Classification Search
CPC .... A47G 33/06; A47G 33/08; A47G 33/0809; A47G 33/0827; A47G 33/0836; A47G 33/0845; A47G 33/0854; A47G 33/0863; A47G 33/0872; A47G 33/0881; A47G 33/12; A47G 33/1206; A47G 33/1213; A47G 33/122; A47G 33/1226; A47G 33/1233; A47G 33/124; A47G 33/1246; A47G 33/1253; A47G 33/126; A47G 33/1266; A47G 33/1273; A47G 33/128;
(Continued)

(56) References Cited

U.S. PATENT DOCUMENTS 4,060,722 A * 11/1977 Foley .................... A47G 33/06
362/123
5,820,248 A * 10/1998 Ferguson ............. G02B 6/0008
362/123
(Continued)

*Primary Examiner* — Robert J May
(74) *Attorney, Agent, or Firm* — James M. Smedley LLC; James Michael Smedley, Esq.

(57) ABSTRACT

Apparatus and associated methods relate to illuminated artificial trees constructed by interconnecting more than one artificial tree trunk section based on electrically connecting and rotationally coupling each tree trunk section to at least one other tree trunk section, each tree trunk section having an emitter of light visible externally to the tree trunk section and optically coupled to a light source within the tree trunk section, and each light source operably coupled to an external controller and power supply. In an illustrative example, each tree trunk section may have a light source optically connected by limited-length optical fiber to a light emitter within the tree trunk section. The light source may be a multi-color LED. The light source may be powered through rotatable male and female connectors mated between tree trunk section ends. Various examples may advantageously provide a consistently bright and tall tree with reduced energy consumption.

11 Claims, 19 Drawing Sheets

(51) Int. Cl.
*F21Y 113/13* (2016.01)
*F21Y 115/10* (2016.01)
*F21W 121/00* (2006.01)
*F21V 8/00* (2006.01)

(52) U.S. Cl.
CPC ..... *A47G 2200/08* (2013.01); *F21W 2121/00* (2013.01); *F21Y 2113/13* (2016.08); *F21Y 2115/10* (2016.08); *G02B 6/0005* (2013.01)

(58) Field of Classification Search
CPC ............ A47G 33/1286; A47G 33/1293; A47G 2033/0827; G02B 6/0005
See application file for complete search history.

(56) References Cited

U.S. PATENT DOCUMENTS

| | | | | |
|---|---|---|---|---|
| 6,017,142 | A * | 1/2000 | Harris, Jr. | A41G 1/005 362/564 |
| 9,593,831 | B2 * | 3/2017 | Yu | F21V 23/06 |
| 9,833,098 | B2 * | 12/2017 | Loomis | A47G 33/06 |
| 2005/0180163 | A1 * | 8/2005 | Huang | A47G 33/06 362/568 |
| 2007/0230174 | A1 * | 10/2007 | Hicks | A47G 33/06 362/249.16 |
| 2013/0301275 | A1 * | 11/2013 | Kim | F21V 29/71 362/294 |

\* cited by examiner

TREE TRUNK HAVING ILLUMINATED CONNECTABLE TRUNK SECTIONS WITH LIGHT SOURCE DISPOSED

CROSS-REFERENCE TO RELATED APPLICATIONS

This application claims the benefit of U.S. Provisional Application No. 62/406,132, filed on Oct. 10, 2016 which is hereby incorporated by reference in its entirety.

TECHNICAL FIELD

Various embodiments relate generally to construction and use of illuminated artificial trees having reduced environmental impact.

BACKGROUND

Artificial trees are trees that are not natural trees. Artificial trees do not occur as a product of nature. Artificial trees are a product of human construction activity. Some artificial trees may have a trunk and branches approximating the form of a natural tree. Artificial trees may be displayed in place of a natural tree. An artificial tree may be constructed from a variety of materials. Constructing an artificial tree from some materials may aid conservation of the natural environment. For example, some artificial trees may be constructed from plastic or metal. Artificial trees may be constructed to various heights. Some artificial trees may be very tall.

Users of artificial trees include individuals and organizations. Users may employ artificial trees to display decoration for a special occasion. Many artificial trees are illuminated with visible light. Artificial trees may display visible lights located in various parts of the tree, including the trunk or branches. Some artificial trees display many lights. Some artificial trees may display various groups of lights at different times. For example, the lights displayed by some artificial trees may be turned on and off in groups to display various lighting patterns. In some artificial trees, lighting patterns may include multiple lights of various colors at different times. Some artificial trees employ a single light in the base of the tree. Optical fibers may couple a light in the base to the trunk or branches. Due to optical loss in the long optical fiber, lights may be dim near the top of taller trees with long optical fibers coupled to a light in the base of the tree. Some artificial trees change the displayed lighting color over time by directing the light through a rotating color wheel.

An artificial tree may require significant electrical energy. Very tall artificial trees may have many lights. An artificial tree with many lights may consume more energy and cost more to operate than a shorter tree with fewer lights. The illumination in some artificial trees may remain active for extended periods of time. For example, an artificial tree employed by a retail business storefront may remain active for several months. An artificial tree with many lights may consume more electrical energy. Artificial trees employing a motorized rotating color wheel may require additional electrical energy to rotate the color wheel. Increased consumption of electrical energy to illuminate lights in an artificial tree may impact the environment and increase the operating cost of the tree.

SUMMARY

Apparatus and associated methods relate to illuminated artificial trees constructed by interconnecting more than one artificial tree trunk section based on electrically connecting and rotationally coupling each tree trunk section to at least one other tree trunk section, each tree trunk section having an emitter of light visible externally to the tree trunk section and optically coupled to a light source within the tree trunk section, and each light source operably coupled to an external controller and power supply. In an illustrative example, each tree trunk section may have a light source optically connected by limited-length optical fiber to a light emitter within the tree trunk section. The light source may be a multi-color LED. The light source may be powered through rotatable male and female connectors mated between tree trunk section ends. Various examples may advantageously provide a consistently bright and tall tree with reduced energy consumption.

Various examples may advantageously provide a safer artificial tree having a light source powered through a safety connector that does not provide a complete circuit until a male connector is inserted.

Various embodiments may achieve one or more advantages. For example, some embodiments may reduce the impact to the environment resulting from operation of an illuminated artificial tree. This facilitation may be a result of reducing the number of lights required to construct an artificial tree. For example, an artificial tree constructed from interconnected tree trunk sections, with each tree trunk section having its own light source coupled to fiber optic light emitters in the tree trunk section, may have fewer lights and consume less energy than artificial trees having many light sources. Some embodiments may provide increased brightness with reduced energy consumption even for taller artificial trees. This facilitation may be the result of reducing optical losses relative to taller trees with tree-length fiber optic coupling, by configuring each tree trunk section with its own light source coupled by limited-length fiber optics to light emitters in the tree trunk section. In some embodiments, the user may customize the artificial tree display to enhance the decorative appearance of an artificial tree. This facilitation may be a result of interconnecting the tree trunk sections with connectors that can turn without losing contact. For example, a user may be able to rotationally reposition tree trunk sections of an artificial tree to adapt certain portions of the tree to a retail display. Various designs may improve the safety of the artificial tree user. This facilitation may be the result of interconnecting the tree trunk sections with connectors that do not provide a complete electrical circuit until a male connector is inserted. For example, a user assembling an artificial tree by interconnecting the tree trunk sections may be protected from an electrical shock hazard by the connector that does not complete the electrical circuit until a tree trunk section with a male connector is interconnected to the open female connector at the top of the tree.

The details of various embodiments are set forth in the accompanying drawings and the description below. Other features and advantages will be apparent from the description and drawings, and from the claims.

BRIEF DESCRIPTION OF THE DRAWINGS

FIG. 18 depicts an exemplary trunk section of a Multi-level LED fiber optic tree having the bulb and fiber optic bundles disposed to one side in the trunk tube to provide space for the wiring to pass through.

FIG. 19 depicts an alternative embodiment trunk section of a Multi-level LED fiber optic tree having the bulb and fiber optic bundles disposed to one side in the trunk tube to provide space for the wiring to pass through.

Like reference symbols in the various drawings indicate like elements.

DETAILED DESCRIPTION OF ILLUSTRATIVE EMBODIMENTS

To aid understanding, this document is organized as follows. First, the construction and use of an exemplary artificial tree based on electrically connecting and rotationally coupling each tree trunk section to at least one other tree trunk section, are briefly introduced with reference to FIG. 1. Second, with reference to FIG. 2, the structure of an exemplary assembled artificial tree is presented from the perspective of a user. Third, with reference to FIGS. 3-5, the discussion turns to exemplary embodiments that illustrate the structure of exemplary tree trunk sections. Specifically, the layout and organization of exemplary tree trunk section components are presented. Then, the layout and organization of exemplary tree stand components are presented with reference to FIG. 6. Next, a schematic view of exemplary electrical connections to illuminate LEDs is presented with reference to FIG. 7. Next, with reference to FIG. 8, the structure of an exemplary embodiment fiber optic base with the multi-LED bulb in the base and the LED at the top of each trunk section is disclosed. Then, support structure details of an exemplary fiber optic base are presented with reference to FIG. 9. Next, with reference to FIG. 10, the structure of an exemplary bulb housing is described. Specifically, an exemplary single bulb housing containing multiple multi-LED bulbs and reflectors is disclosed. Then, schematic views of exemplary embodiment light source, remote control, and controller electrical connections are disclosed, with reference to FIGS. 11-13. Next, the structure of an exemplary controller having a Light Activation Sequence Management Engine (LASME) is presented with reference to FIG. 14. Then, a process flow of an exemplary Light Activation Sequence Management Engine (LASME) is presented with reference to FIG. 15. Next, the structure of an exemplary remote control is disclosed, with reference to FIG. 16. Then, with reference to FIG. 17, an exemplary user interface to an exemplary remote control is presented. Next, with reference to FIGS. 18-19, exemplary embodiment trunk sections of a Multi-level LED fiber optic tree having the bulb and fiber optic bundles disposed to one side in the trunk tube are described. Then, with reference to FIG. 20, the design of an exemplary trunk tube divided into rotationally movable halves to enable assembly of the trunk tube by inserting fiber optic bundles in one half and securing the other half. is disclosed. Finally, with reference to FIG. 21, the design of an embodiment motorized base configured to rotate an exemplary fiber optic tree is discussed.

Figure 1:
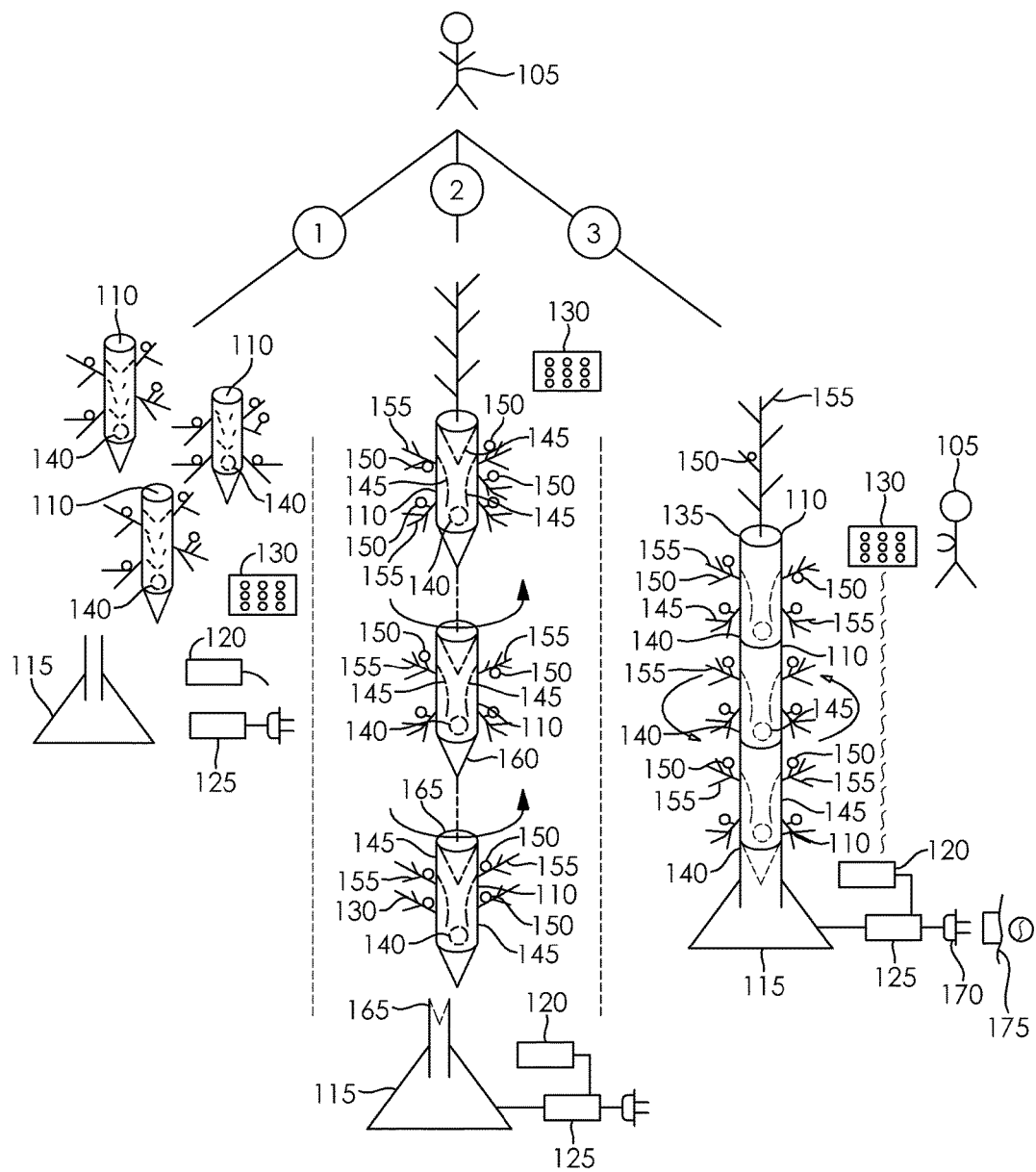
FIG. 1 depicts a user interconnecting more than one artificial tree trunk section to construct an exemplary artificial tree, based on electrically connecting and rotationally coupling each tree trunk section to at least one other tree trunk section, each tree trunk section having an emitter of light visible externally to the tree trunk section and optically coupled to a light source within the tree trunk section, and each light source operably coupled to a controller and electrical power supply external to the tree trunk section.

FIG. 1 depicts a user interconnecting artificial tree trunk sections to construct an exemplary artificial tree, based on electrically connecting and rotationally coupling each tree trunk section to at least one other tree trunk section, each tree trunk section having an emitter of light visible externally to the tree trunk section and optically coupled to a light source within the tree trunk section, and each light source operably coupled to a controller and electrical power supply external to the tree trunk section. In FIG. 1, the user 105 assembles at least one exemplary artificial tree trunk section 110, a tree stand 115, a controller 120, a power supply 125, and a remote control 130, to construct an exemplary illuminated artificial tree 135. The user 105 may program and activate various lighting scenarios in the illuminated artificial tree 135 through remote control 130. In some embodiments, the remote control 130 may be a wireless remote control. In various implementations, the remote control 130 may be communicatively coupled to controller 120 via a wireless communication link. In some embodiments, the remote control 130 may be communicatively coupled to controller 120 via a wired communication link.

A light source 140, optically coupled to an optic fiber bundle 145, may be configured within each artificial tree trunk section 110. In some examples, the optic fiber bundle 145 may have more than one optic fiber. In various designs, an emitter of light 150 may be optically coupled to the light source 140 via the optic fiber bundle 145. In some embodiments, tree trunk section 110 may have one or more tree branch 155. In some examples, the optic fiber bundle 145 may exit the tree trunk section 110. One or more optic fiber of the optic fiber bundle 145 may exit the tree trunk section through one or more tree branch 155. In various designs, a trunk section or branch may have more than one optic fiber exit. In some embodiments, the emitter of light 150 may be positioned substantially on an outer surface of tree trunk section 110 or tree branch 155, to emit light visible externally to the tree trunk section 110 or tree branch 155. In some designs, the emitter of light may be fiber optic ends fused into a bulb shape. In various examples, one or more tree trunk section 110, or one or more tree branch 155 may be opaque to visible light. In some embodiments, one or more tree trunk section 110, or one or more tree branch 155 may be translucent to visible light. The emitter of light 150 may be positioned substantially within the tree trunk section 110 or tree branch 155. In various examples, the light source 140 may be an LED.

One or more light source 140 in each tree trunk section 110 may electrically connect through male connector 160 and female connector 165 to power supply 125. Each tree trunk section 110 interconnected to form the illuminated artificial tree 135 may be electrically connected through a male connector 160 located at the bottom of each section, and a female connector 165 located at the top of each section, with a male connector 160 configured in one tree trunk section 110 electrically and rotationally connected to a female connector 165 configured in another tree trunk section 110. In various embodiments, the male connector 160 configured at a first end of a tree trunk section 110 may be electrically connected to the female connector 165 configured at a second end of the same tree trunk section 110. In some designs, tree stand 115 may be configured with a female connector 165 located at the top of the tree stand 115. The tree trunk section 110 interconnected to the tree stand 115 may be electrically and rotationally connected through a male connector 160 located at the bottom of each section to a female connector 165 located at the top of the tree stand 115. In various examples, the female connector 165 located at the top of the tree stand 115 may be electrically connected to the power supply 125. The female connector 165 located at the top of the tree stand 115 may be electrically connected to the controller 120. In various embodiments, the power supply 125 may be electrically connected through the power connection 170 to an electrical energy source 175.

In some designs, the power connection 170 may be a wired connection. In various embodiments, the power connection 170 may be a wireless connection. For example, the power connection 170 may be an electromagnetic coupling through free space from electrical energy source 175 to power supply 125. In various examples, the power connection 170 from electrical energy source 175 to power supply 125 may be inductive coupling using magnetic fields. In various examples, the power connection 170 from electrical energy source 175 to power supply 125 may be capacitive coupling using electric fields. In some embodiments, the electrical energy source 175 may be an alternating current source. In various designs, the electrical energy source 175 may be derived from an electrical grid. In various designs, the electrical energy source 175 may be derived from a battery. In various designs, the electrical energy source 175 may be derived from wind, solar, geothermal, or other natural sources of energy.

Figure 2:
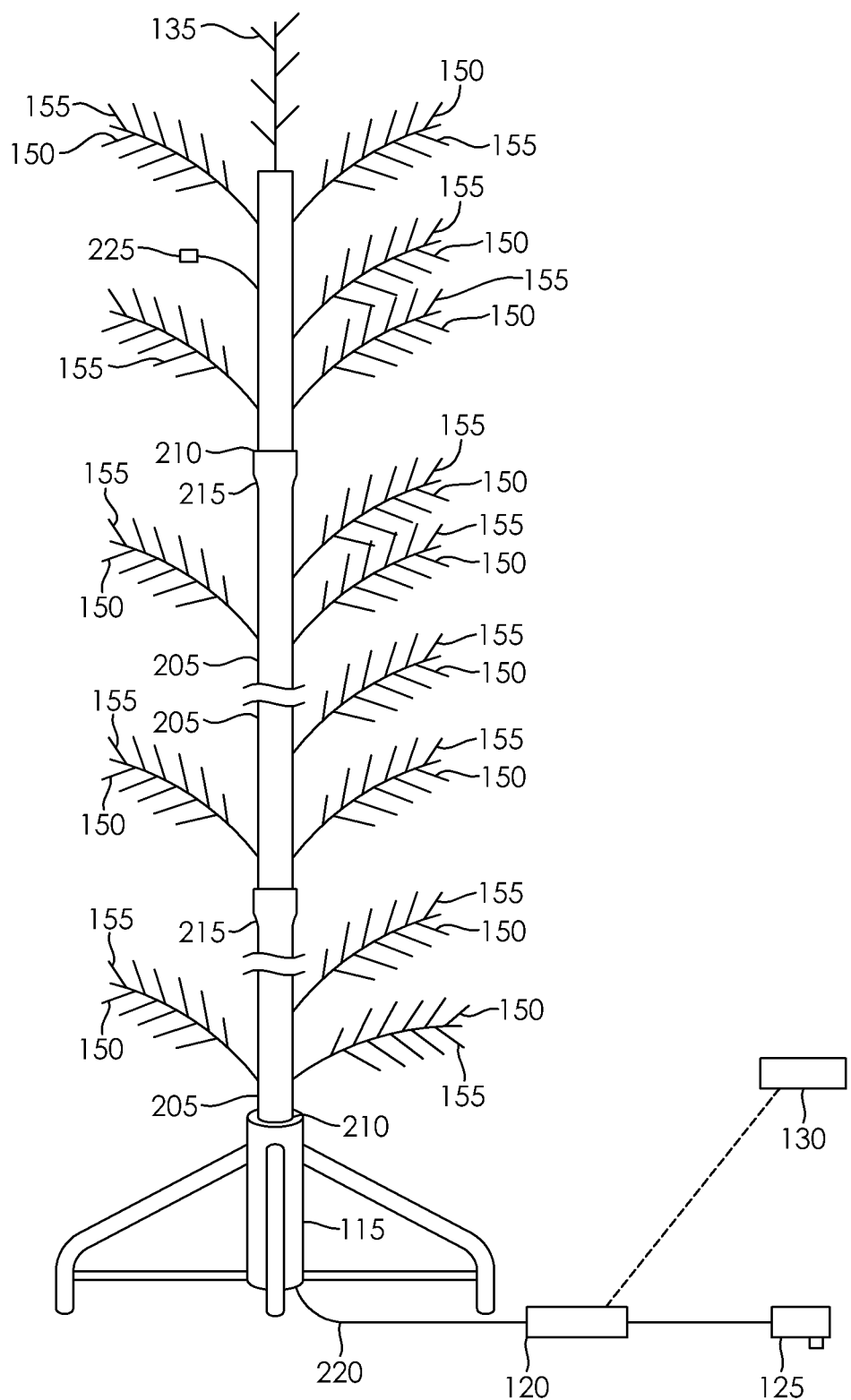
FIG. 2 depicts an exterior view of an exemplary fiber optic tree with multiple tree sections having fiber optic bundles and fibers internal to the tree, which exit the tree to display color patterns at the end of their fibers, with a multiple bulb LED internal to the tree trunk, and electrical connectors supplying the needed current to each section, with power and control circuits in separate housings.

FIG. 2 depicts an exterior view of an exemplary fiber optic tree with multiple tree sections having fiber optic bundles and fibers internal to the tree, which exit the tree to display color patterns at the end of their fibers, with a multiple bulb LED internal to the tree trunk, and electrical connectors supplying the needed current to each section, with power and control circuits in separate housings. In FIG. 2, an exemplary artificial tree 135 is interconnected to a tree stand 115 by a trunk tube 205 with male contacts at a first end of a bottom tree section. Tree section stop block 210 interconnects a second end of a bottom tree section to an upper tree section trunk end 215 with female contacts. Light source power leads 220 electrically connect the power supply 125 to the base of tree stand 115. In the depicted embodiment, light source power leads 220 electrically connect the power supply 125 to the wired pig-tail connector 225 to provide electrical energy illumination and decorative accessories attachable to the wired pig-tail connector 225. In various designs, the remote control 130 may be employed to activate diverse and decorative light patterns or sequences to illuminate the artificial tree 135. The remote control 130 may direct the controller 120 to activate a light source optically coupled to one or more emitter of light 150 positioned upon one or more branch 155.

Figure 3:
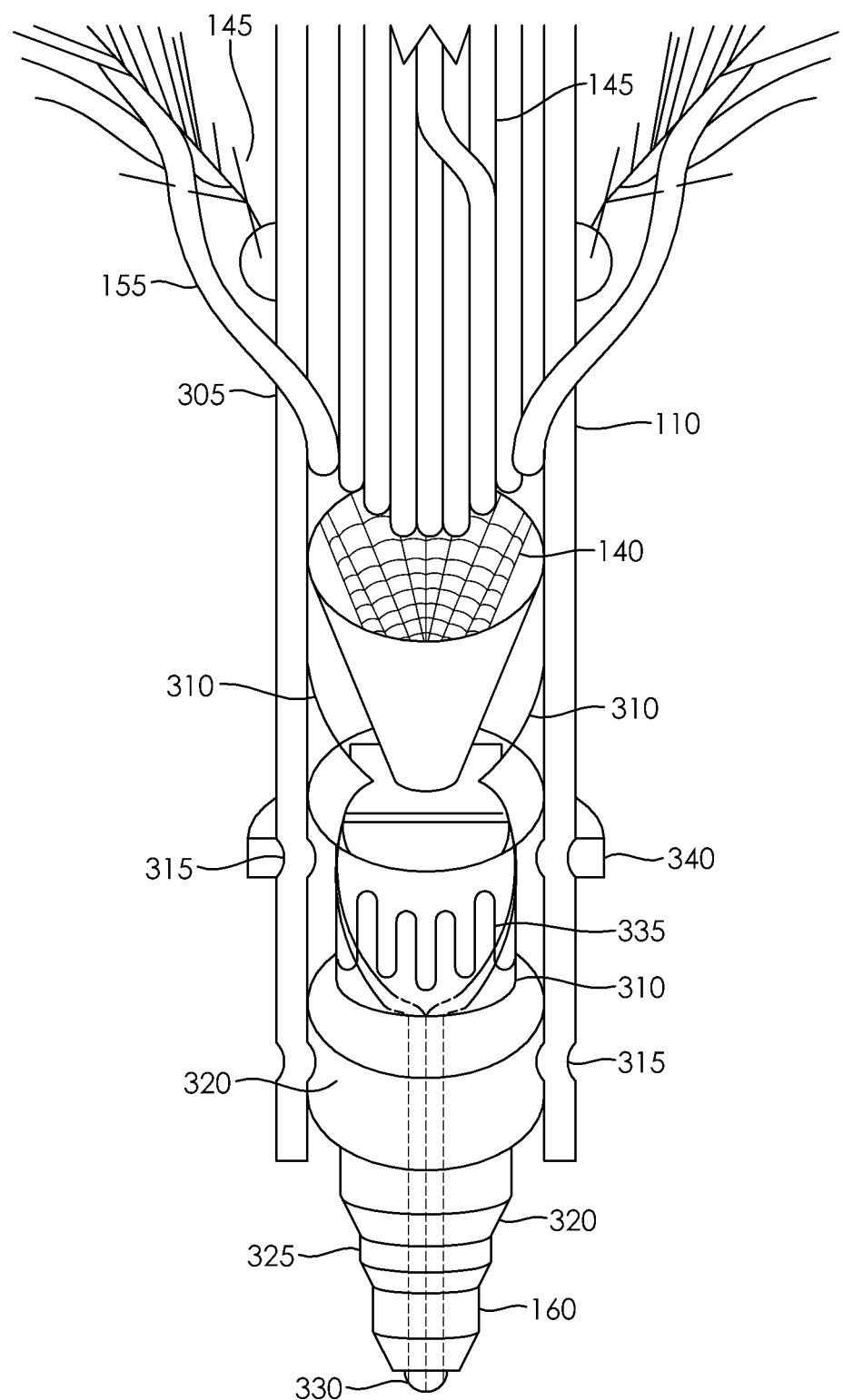
FIG. 3 depicts a cross-sectional view of an exemplary trunk section, displaying a male connector at the bottom of the trunk section, with a multi-bulb LED above the connector, a heat sink in contact with a metal tree trunk tube, and fiber optic bundles above the LED.

FIG. 3 depicts a cross-sectional view of an exemplary trunk section 110, displaying a male connector 160 at the bottom of the trunk section, with a multi-bulb LED above the connector, a heat sink in contact with a metal tree trunk tube, and fiber optic bundles above the LED. In FIG. 3, the light source 140 is optically coupled to fiber optic bundle 145 which exits the trunk section 110 via fiber optic bundle exit slot 305. Bulb leads 310 connect electric supply current to the light source 140. In some designs, the light source 140 may be a multi-bulb LED. In various embodiments, the securing dimple 315 rotationally engages an interconnecting trunk section. In some designs, the light source 140 is electrically connected to an interconnecting trunk section via insulator 320, contact ring 325, and contact terminal 330. The light source 140 may be mounted above the male connector 160. In some designs, the fiber optic bundle 145 may be located above the light source 140. In various implementations, the light source 140 may be located between the fiber optic bundle 145 and the male connector 160. In various examples, the heat sink 335 may be thermally connected to the light source 140 and the trunk section 110. In some embodiments, the light source 140 may mounted to be in physical contact with the heat sink 335. In various examples, the heat sink 335 may be mounted to be in physical contact with the trunk section 110. The tube section securing ring 340 mechanically interlocks an interconnecting tree trunk section.

Figure 4:
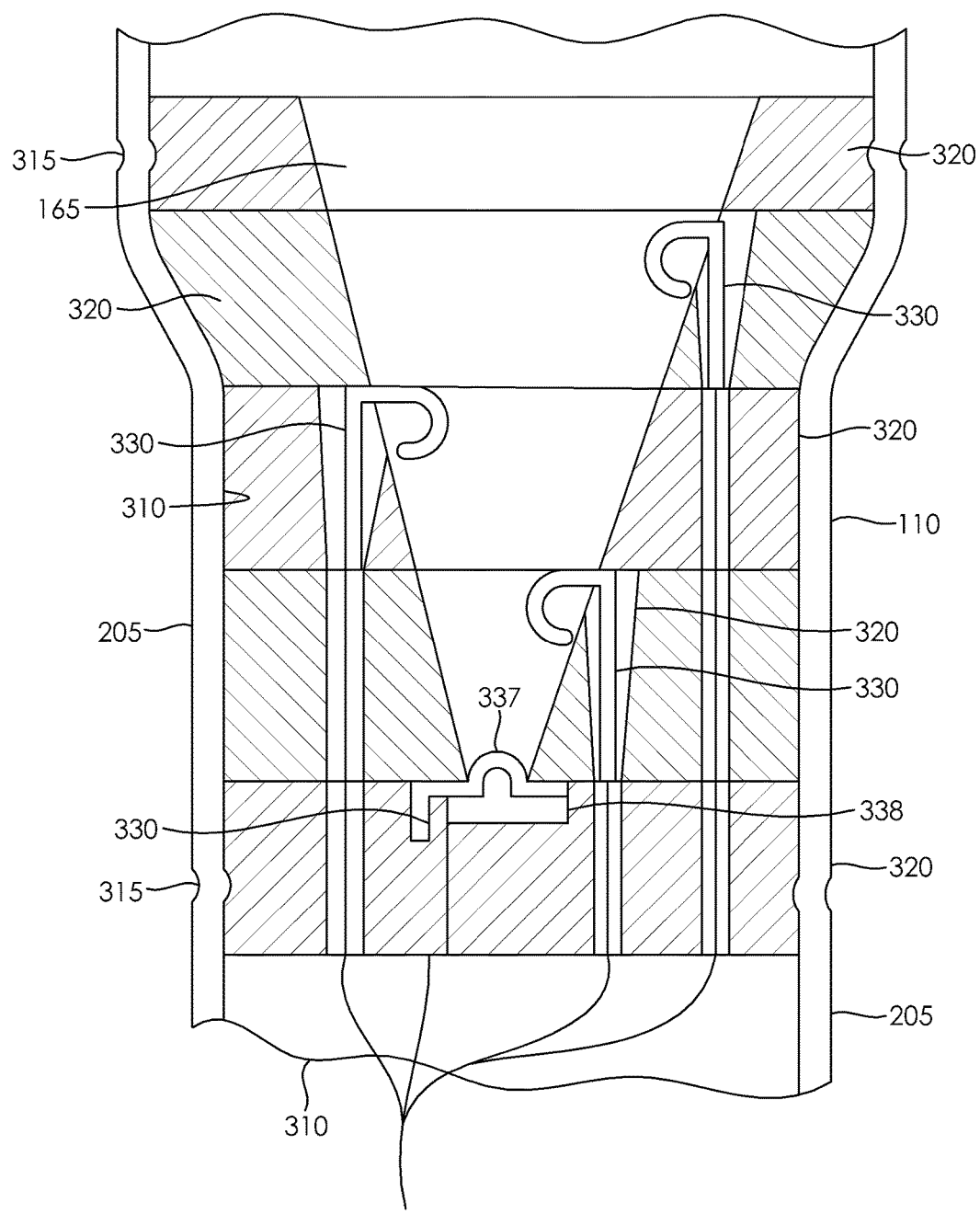
FIG. 4 depicts a cross-sectional view of an exemplary tree trunk section, displaying a female connector at the top of the tree section.

FIG. 4 depicts a cross-sectional view of an exemplary tree trunk section, displaying a female connector at the top of the tree section. In FIG. 4, one end of tree trunk section 110 is configured as a female connector 165 to electrically connect and rotationally couple another interconnecting trunk section. Bulb leads 310 connect electric supply current to the female connector 165. In various embodiments, the securing dimple 315 rotationally engages another trunk section interconnecting with trunk tube 205. In some designs, the female connector 165 is electrically connected to an interconnecting trunk section via insulator 320, contact ring 325, and contact terminal 330. In some embodiments, the safety contact 337 is configured as a center contact in the female connector 165 to supply the common return current. In various implementations, the safety contact 337 may be configured as a terminal that is not electrically connected to contact terminal 330 until a male center terminal from an interconnecting trunk section is inserted into the female connector 165. A male center terminal inserted from an interconnecting trunk section may force the safety contact 337 female contact to be depressed and complete the supply circuit.

Figure 5:
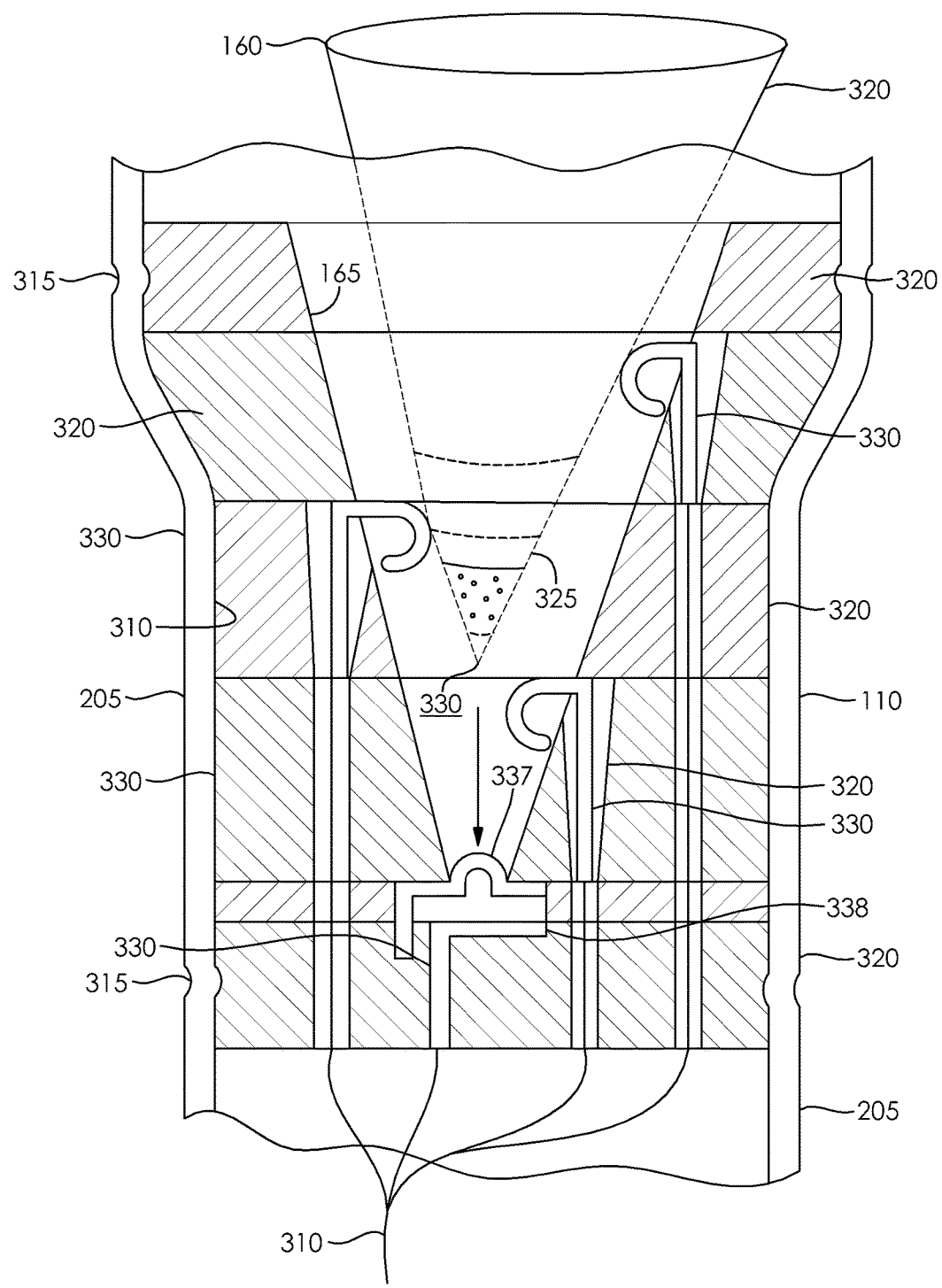
FIG. 5 depicts a cross-sectional view of an exemplary tree trunk section, displaying a female connector at the top of the tree section, a male connector at the bottom of an interconnecting tree section connecting to the female connector, and the male connector depressing a safety connector within the female connector.

FIG. 5 depicts a cross-sectional view of an exemplary tree trunk section, displaying a female connector at the top of the tree section, a male connector at the bottom of an interconnecting tree section connecting to the female connector, and the male connector depressing a safety connector within the female connector. In FIG. 5, one end of tree trunk section 110 is configured as a female connector 165 to electrically connect and rotationally couple another interconnecting trunk section configured with male connector 160. Bulb leads 310 connect electric supply current to the female connector 165. In various embodiments, the securing dimple 315 rotationally engages another trunk section interconnecting with trunk tube 205. In some designs, the female connector 165 is electrically connected to an interconnecting trunk section via insulator 320, contact ring 325, and contact terminal 330. In some embodiments, the safety contact 337 is configured as a center contact in the female connector 165 to supply the common return current. In various implementations, the safety contact 337 may be configured as a terminal that is not electrically connected to contact terminal 330 until a male center terminal from an interconnecting trunk section configured with male connector 160 is inserted into the female connector 165. A male center terminal inserted from an interconnecting trunk section configured with male connector 160 forces the safety contact 337 female contact to be depressed and completes the supply circuit.

Figure 6:
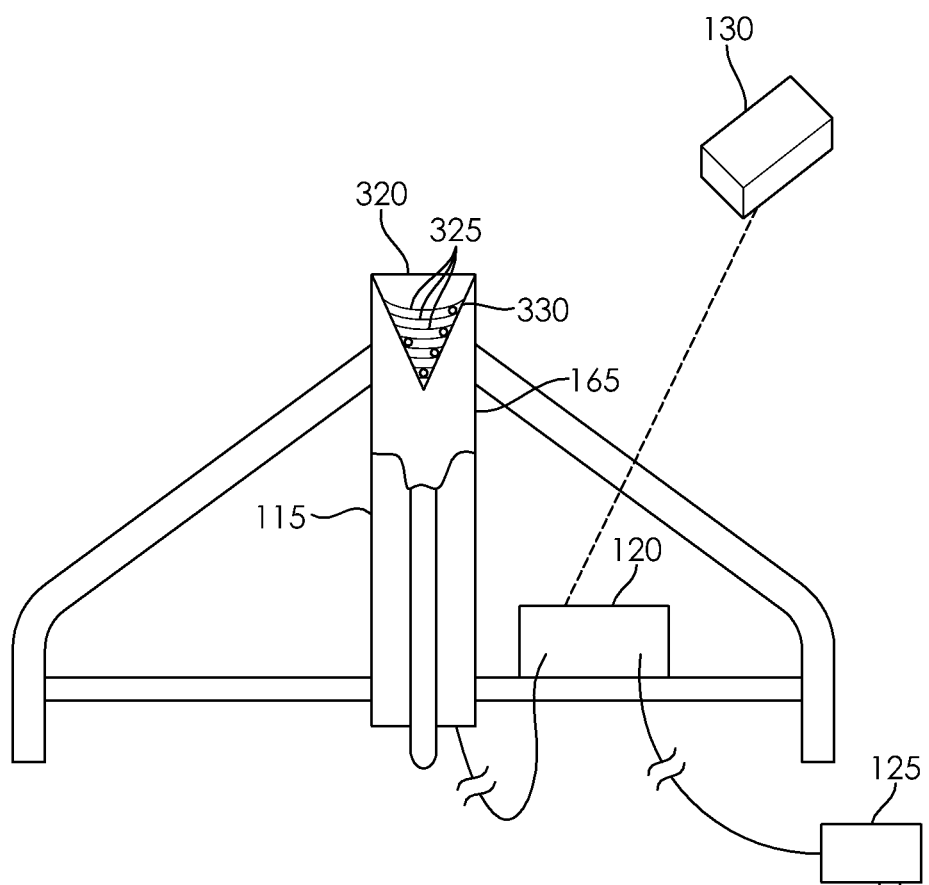
FIG. 6 depicts a partial cross-sectional view of an exemplary tree stand displaying a female connector within the top of the tree stand.

FIG. 6 depicts a partial cross-sectional view of an exemplary tree stand displaying a female connector within the top of the tree stand. In FIG. 6, the tree stand 115 is configured with a female connector 165 to electrically connect and rotationally couple an interconnecting trunk section. In some embodiments, the female connector 165 may electrically connect to an interconnecting trunk section via insulator 320, contact ring 325, and contact terminal 330. In various implementations, the tree stand 115 may be configured to connect electrical supply current from the power supply 125 to contact terminal 330. In some embodiments, the tree stand 115 may be wired to controller 120. In various examples, the controller 120 may be adapted to electrically energize contact terminal 330 in female connector 165. The remote control 130 may direct the controller to electrically energize contact terminal 330 in female connector 165. In some designs, the tree stand 115 may include a motor adapted to rotate an interconnecting trunk section.

Figure 7:
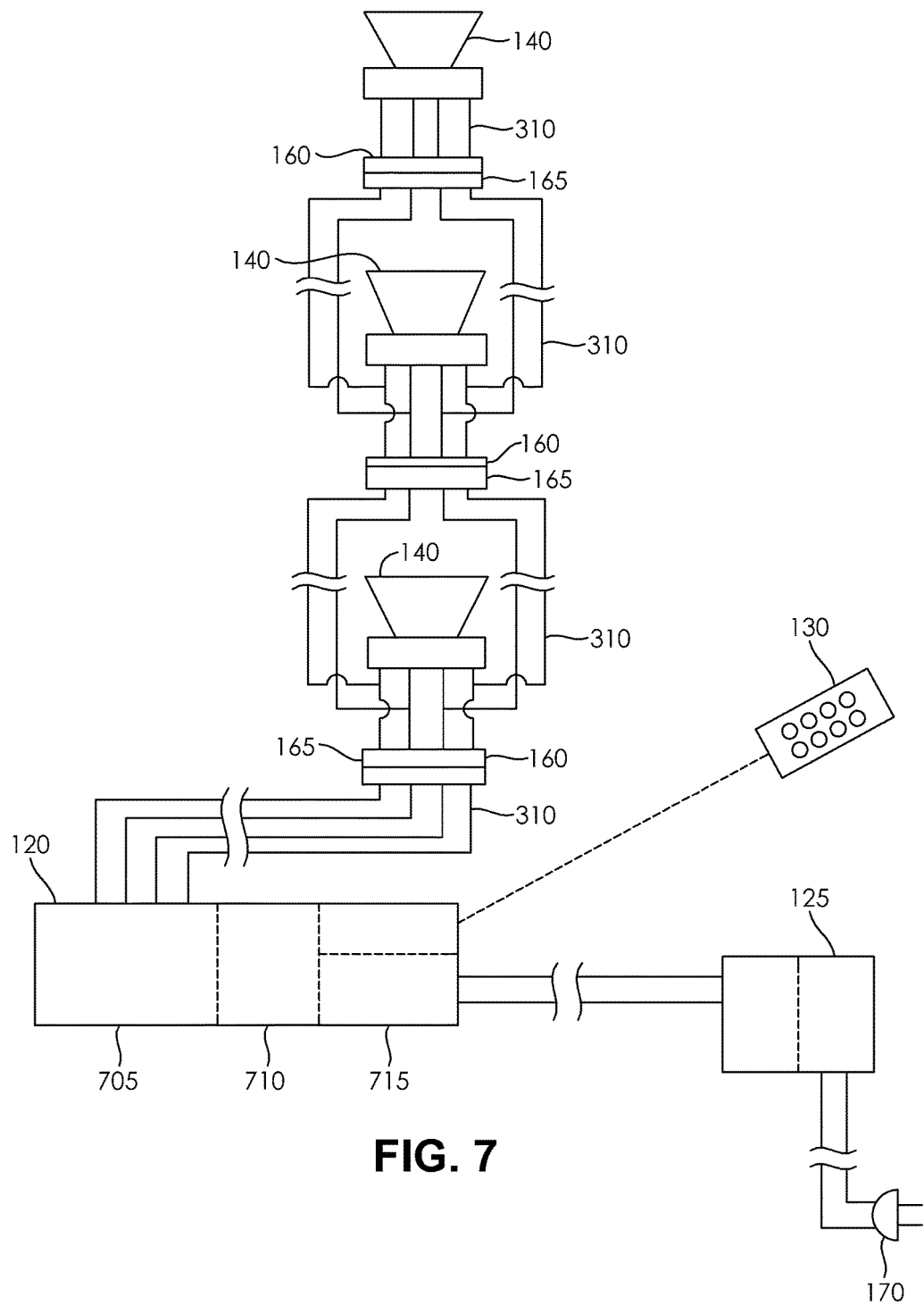
FIG. 7 depicts a schematic view of exemplary electrical connections to illuminate LEDs.

FIG. 7 depicts a schematic view of exemplary electrical connections to illuminate LEDs. In FIG. 7, the power supply 125 adapts electrical energy from the power connection 170 to operate the controller 120. In some embodiments, the controller 120 may include a power amp module 705. In various examples, the power amp module may be adapted to govern the power supplied to one or more light source 140.

In some designs, the controller 120 may include a CPU/Memory/Output Section 710. In some examples, the CPU/Memory/Output Section 710 may contain program instructions executable by the CPU to provide a user the capability of programming unique and individual color sequences and activating the color sequences by electrically energizing one or more light source 140. In various implementations, the controller 120 may include a Receiver Section 715 adapted to accept wireless control input from the remote control 130. The remote control 130 may direct the controller 120 to activate one or more light source 140. In various embodiments, bulb leads 310 may electrically connect the controller 120 to a female connector 165. In some examples, the female connector 165 may electrically connect to a male connector 160 adapted to energize one or more light source 140. In some designs, bulb leads 310 may electrically connect one or more light source 140 to a male connector 160. In various designs, the bulb leads 310 may electrically connect more than one light source 140 in the same housing. In some designs, a single housing may contain more than one individual reflective segment, each reflective segment containing more than one light source 140. The light source 140 may be an LED. In some designs, the light source 140 may be a multi-LED light source. In various implementations, the light source 140 may be an LED light source capable of generating more than one color of light.

Figure 8:
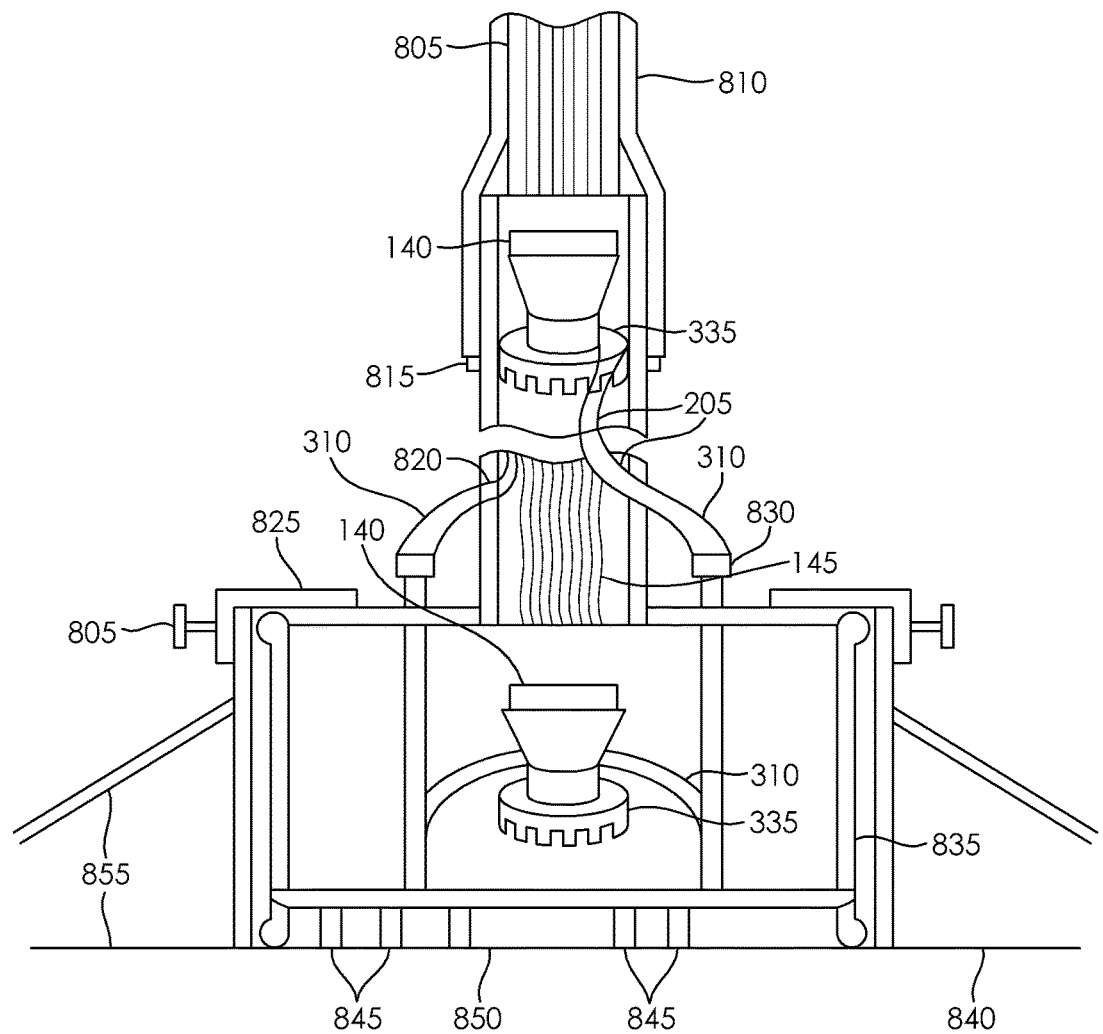
FIG. 8 depicts a cross-sectional view of the structure of an exemplary embodiment fiber optic base with the multi-LED bulb in the base and the LED at the top of each trunk section.

FIG. 8 depicts a cross-sectional view of the structure of an exemplary embodiment fiber optic base with the multi-LED bulb in the base and the LED at the top of each trunk section. In FIG. 8, lower securing screw 805 and upper securing screw 820 retain trunk tube 205 in the base assembly 855 to rotationally engage the trunk tube 205 in physical contact with tube section stop block 815. The bulb leads 310 electrically connect the light source 140 to the connector 830. The base assembly 855 may be configured to electrically connect an external power supply to the connector 830. In various examples one or more light source 140 may be mounted within the housing base 850. In some designs the light source 140 may be an LED light source. In various implementations, the light source 140 may be a multi-LED light source optically coupled via optic fiber bundle 145 to emit light visible externally from the fiber optic base. The light source 140 is physically mounted in thermal connection to the heat sink 335 within the housing base 850. The heat sink 335 is physically mounted in thermal connection to the housing base 850. The base assembly 855 vertically supports the interconnected upper tree trunk 810 with base horizontal support 840 and base upper support 835. The base assembly 855 is reinforced with top hold down plate 825 and secured with base mounting screw 845.

Figure 9:
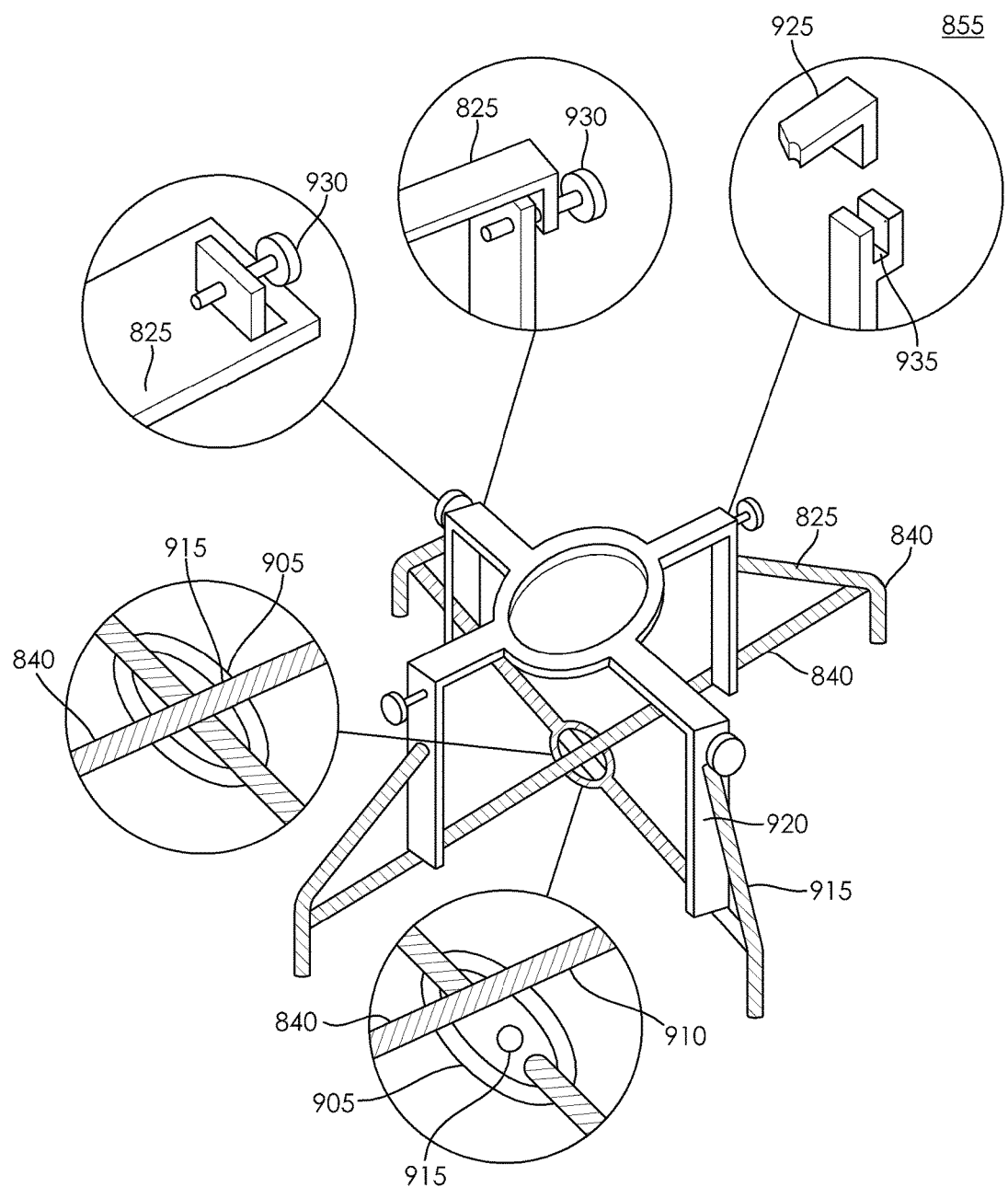
FIG. 9 depicts a detail view of an exemplary embodiment fiber optic base support structure.

FIG. 9 depicts a detail view of an exemplary embodiment fiber optic base support structure. In FIG. 9, horizontal stabilization of the base assembly 855 is enhanced to support the increased weight of taller fiber optic trees by securing base horizontal supports 840 to the base legs 915 with cross over horizontal plate 905 and bottom securing pin 910. Vertical stabilization of the base assembly 855 is enhanced to support the increased weight of taller fiber optic trees by securing the vertical support 920 to the top hold down plate 825 with vertical flange 925, top securing pin 930, and u-shape capture bracket 935.

Figure 10:
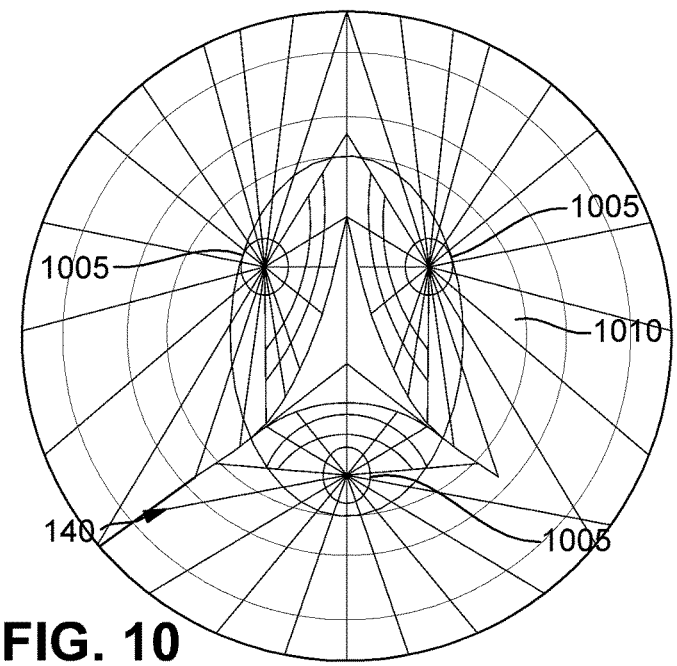
FIG. 10 depicts a component layout view of an exemplary embodiment bulb housing.

FIG. 10 depicts a component layout view of an exemplary embodiment bulb housing. In FIG. 10, the light source 140 is a multi-3 color LED housing 1005. In various designs the light source 140 is configured with bulb housing reflective lens 1010 to provide individual colors into the individual fiber optic bundles directly mounted above the multi bulb housing, as depicted in FIGS. 3 and 8. In various implementations the light source 140 may be configured with more than one multi-3 color LED housing 1005 containing more than one multi-LED bulb or reflector.

Figure 11:
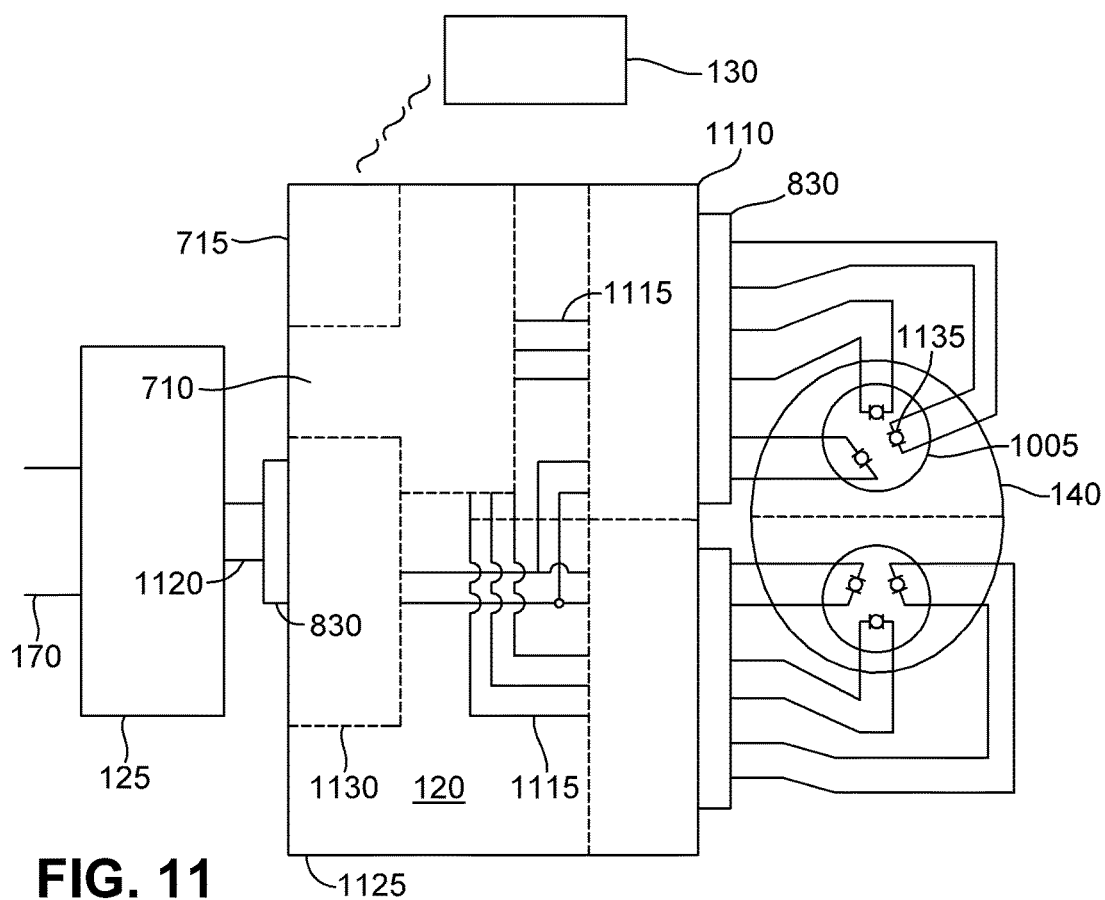
FIG. 11 depicts a schematic view of exemplary embodiment light source, remote control, and controller electrical connections for a multi-color, multi bulb circuit.

FIG. 11 depicts a schematic view of exemplary embodiment light source, remote control, and controller electrical connections for a multi-color, multi bulb circuit. In FIG. 11, power supply 125 adapts electrical energy from the power connection 170 to operate the controller 120. The power leads 1120 and connector 830 electrically connect the controller 120 to the power supply 125 and AC/DC transformer adapter 1125. In some embodiments, the controller 120 is configured with an LED output control section 1110 operably coupled to a power amp module 1130 adapted to govern the power supplied to one or more light source 140. In some designs, signal leads 1115 electrically connect one or more light source 140 to the power amp module 1130 and output control section 1110. In some designs, the light source 140 may include a single LED 1135. In various examples, the light source 140 may include a multi-3 color LED housing 1005. In some designs, the controller 120 may include a CPU/Memory/Output Section 710. In some examples, the CPU/Memory/Output Section 710 may contain program instructions executable by the CPU to provide a user the capability of programming unique and individual color sequences and activating the color sequences by electrically energizing one or more light source 140. In various implementations, the controller 120 may include a Receiver Section 715 adapted to accept wireless control input from the remote control 130. The remote control 130 may direct the controller 120 to activate one or more light source 140.

Figure 12:
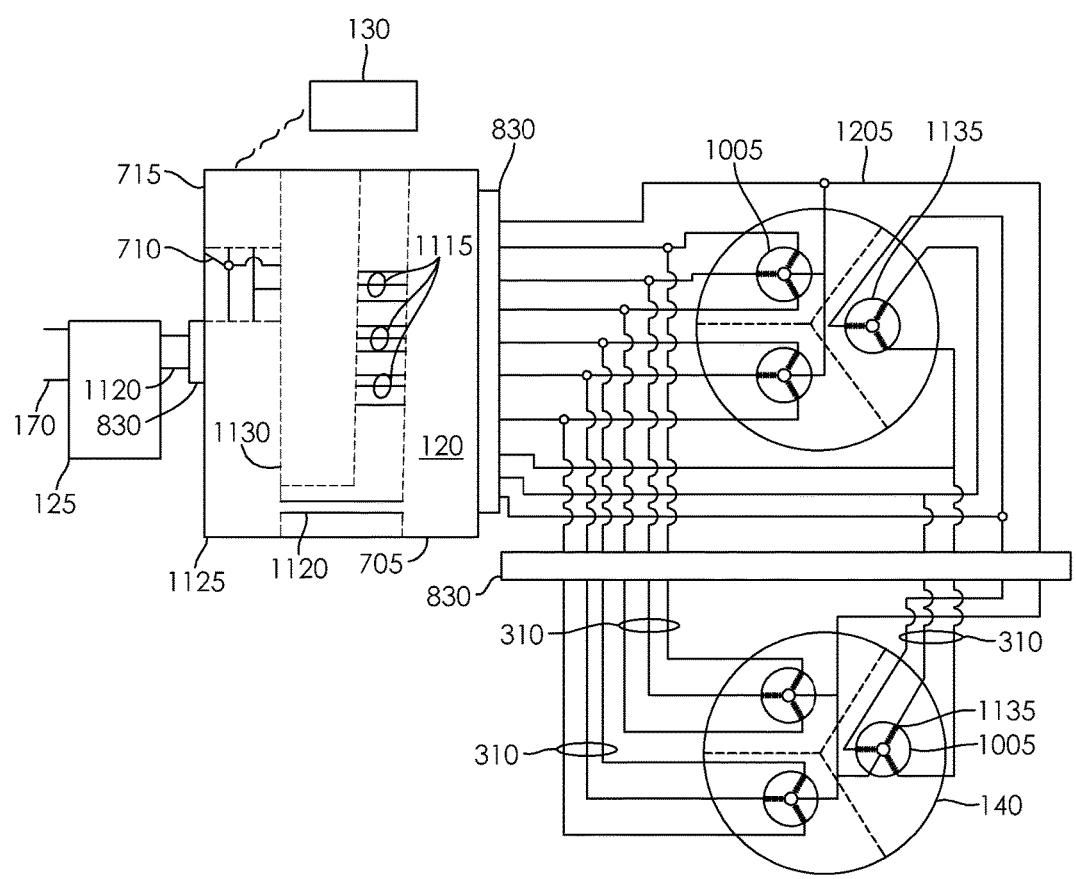
FIG. 12 depicts a schematic view of exemplary embodiment light source, remote control, and controller electrical connections for multiple multi-LED, multi-color, multi-bulb circuits.

FIG. 12 depicts a schematic view of exemplary embodiment light source, remote control, and controller electrical connections for multiple multi-LED, multi-color, multi-bulb circuits. In FIG. 12, power supply 125 adapts electrical energy from the power connection 170 to operate the controller 120. The power leads 1120 and connector 830 electrically connect the controller 120 to the power supply 125 and AC/DC transformer adapter 1125. In some embodiments, the controller 120 is configured with an LED output control section 1110 operably coupled to a power amp module 1130 adapted to govern the power supplied to more than one light source 140. In various implementations, more than one light source 140 may be electrically connected to the LED output control section 1110 and power amp module 1130 by a common return 1205, bulb leads 310 and connector 830. In some designs, signal leads 1115 electrically connect more than one light source 140 to the power amp module 1130 and output control section 1110. In some designs, the light source 140 may include more than one single LED 1135. In various examples, the light source 140 may include more than one multi-3 color LED housing 1005. In some designs, the controller 120 may include a CPU/Memory/Output Section 710. In some examples, the CPU/Memory/Output Section 710 may contain program instructions executable by the CPU to provide a user the capability of programming unique and individual color sequences and activating the color sequences by electrically energizing one or more light source 140. In various implementations, the controller 120 may include a Receiver Section 715 adapted to accept wireless control input from the remote control 130. The remote control 130 may direct the controller 120 to activate one or more light source 140.

Figure 13:
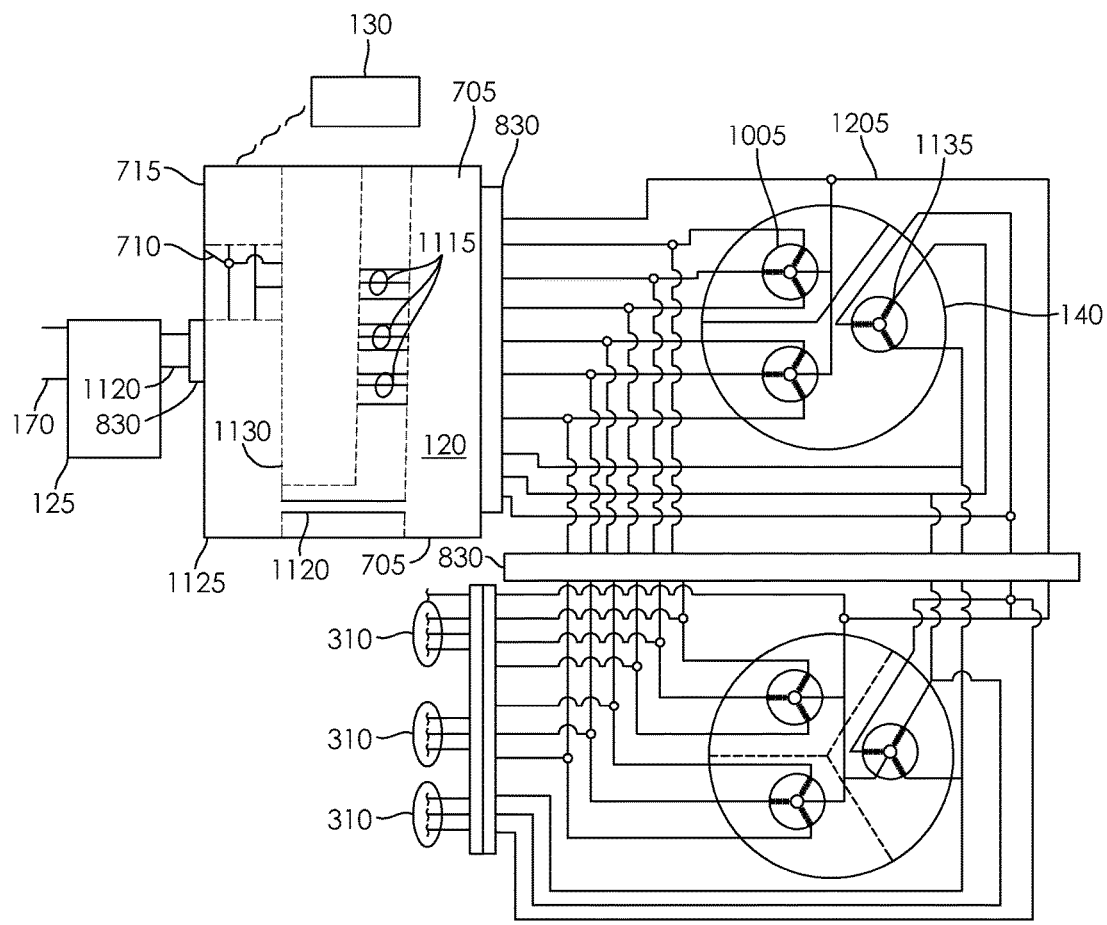
FIG. 13 depicts a schematic view of exemplary embodiment light source, remote control, and controller electrical connections for the reflectors with multiple 3 color bulbs in one housing.

FIG. 13 depicts a schematic view of exemplary embodiment light source, remote control, and controller electrical connections for the reflectors with multiple 3 color bulbs in one housing. In FIG. 13, power supply 125 adapts electrical energy from the power connection 170 to operate the controller 120. The power leads 1120 and connector 830 electrically connect the controller 120 to the power supply 125 and AC/DC transformer adapter 1125. In some embodiments, the controller 120 is configured with an LED output control section 1110 operably coupled to a power amp module 1130 adapted to govern the power supplied to more than one light source 140. In various implementations, more than one light source 140 may be electrically connected to the LED output control section 1110 and power amp module 1130 by a common return 1205, bulb leads 310 and connector 830. In some designs, signal leads 1115 electrically connect more than one light source 140 to the power amp module 1130 and output control section 1110. In some designs, the light source 140 may include more than one single LED 1135. In various examples, the light source 140 may include more than one multi-3 color LED housing 1005. In various designs the light source 140 is configured with at least one bulb housing reflective lens to provide individual colors into the individual fiber optic bundles directly mounted above the multi bulb housing, as depicted in FIGS. 3 and 8. In various implementations the light source 140 may be configured with more than one multi-3 color LED housing 1005 containing more than one multi-LED bulb or reflector. In some designs, the controller 120 may include a CPU/Memory/Output Section 710. In some examples, the CPU/Memory/Output Section 710 may contain program instructions executable by the CPU to provide a user the capability of programming unique and individual color sequences and activating the color sequences by electrically energizing one or more light source 140. In various implementations, the controller 120 may include a Receiver Section 715 adapted to accept wireless control input from the remote control 130. The remote control 130 may direct the controller 120 to activate one or more light source 140.

Figure 14:
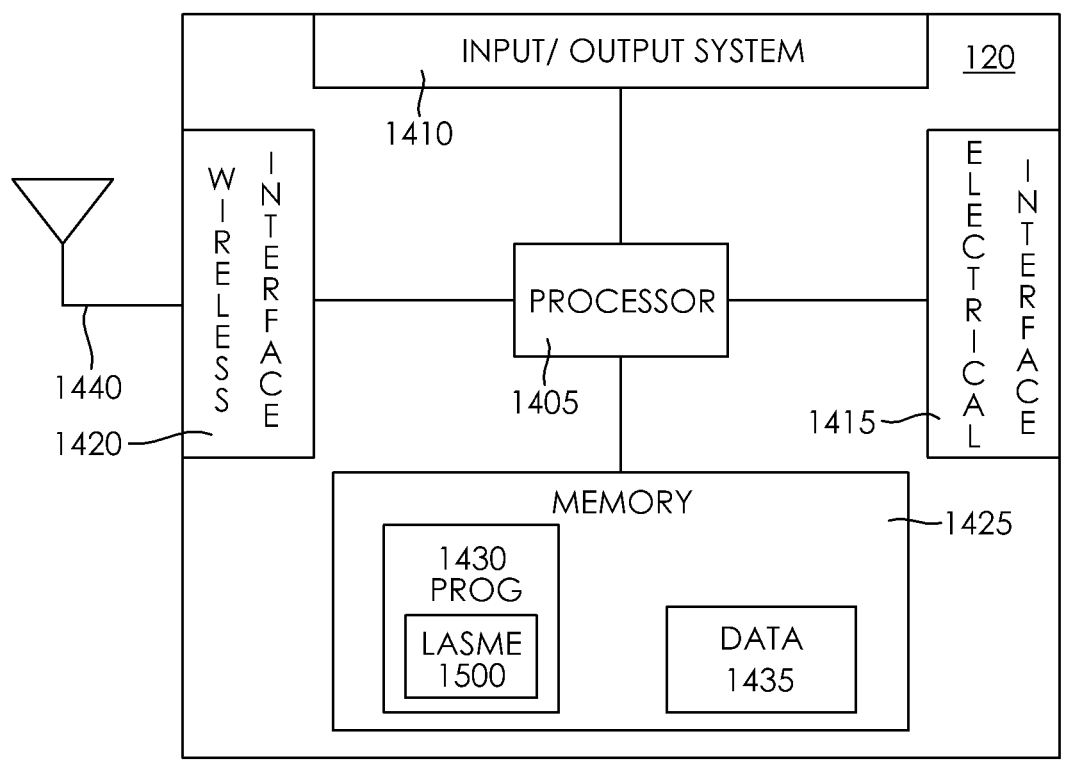
FIG. 14 depicts a structural view of an exemplary controller having a Light Activation Sequence Management Engine (LASME).

FIG. 14 depicts a structural view of an exemplary controller having a Light Activation Sequence Management Engine (LASME). In FIG. 14, an exemplary controller 120 includes a processor 1405 that is in electrical communication with memory 1425. The depicted memory 1425 also includes program instructions 1430 and data 1435 to implement Light Activation Sequence Management Engine (LASME) 1500. The processor 1405 is communicatively coupled to input/output system 1410 to receive input and provide output. The processor 1405 is operably coupled to the electrical interface 1415 adapted to control and monitor electrical devices. The processor 1405 is configured to communicate with a wireless network via wireless interface 1420 via antenna 1440. In some examples, the processor 1405 may be configured to communicate with wireless networks or wireless devices via other interfaces. For example, in some designs, the controller may include a Bluetooth interface. In some embodiments, the controller may include an ultrasonic data interface. In some embodiments, the controller may include a Wi-Fi interface.

Figure 15:
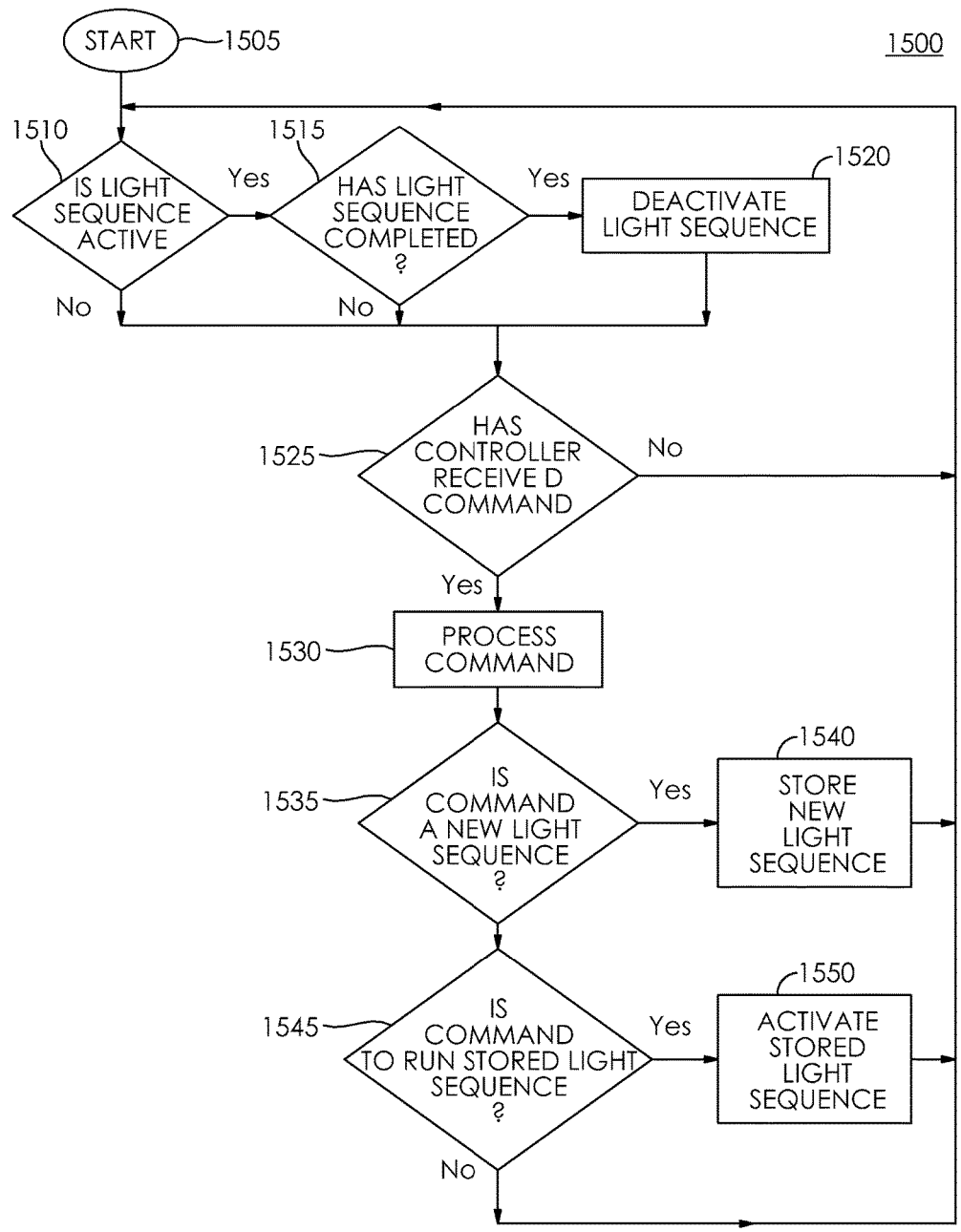
FIG. 15 depicts a process flow of an exemplary Light Activation Sequence Management Engine (LASME).

FIG. 15 depicts a process flow of an exemplary Light Activation Sequence Management Engine (LASME). The method depicted in FIG. 15 is given from the perspective of the Light Activation Sequence Management Engine (LASME) 1500 executing as program instructions on processor 1405, depicted in FIG. 14. The depicted method 1500 begins 1505 with the processor 1405 determining 1510 if a light sequence is active. Upon a determination 1515 by the processor 1405 that a light sequence is active, the method continues with the processor 1405 determining 1515 if the light sequence has completed. Upon a determination 1520 by the processor 1405 the light sequence has completed, the processor 1405 deactivates 1520 the light sequence. Returning for illustrative purpose of description to step 1510, upon a determination 1510 by the processor 1405 a light sequence is not active, operation continues at step 1525. Returning for illustrative purpose of description to step 1515, upon a determination 1515 by the processor 1405 the light sequence has not completed, operation continues at step 1525. At step 1525, the processor determines if the controller has received a command. Upon a determination 1525 by the processor 1405 the controller has received a command, the processor 1405 processes 1530 the command Upon a determination 1525 by the processor 1405 the controller has not received a command the method continues at step 1510 with the processor 1405 determining 1510 if a light sequence is active. Upon the processor 1405 processing 1530 a command, the processor 1405 determines 1535 if the command is a new light sequence. Upon a determination by the processor 1405 the command is a new light sequence, the processor 1405 stores 1540 the new light sequence and the method continues at step 1510 with the processor 1405 determining 1510 if a light sequence is active. Upon a determination by the processor 1405 the command is not a new light sequence, the processor 1405 determines 1545 if the command is to run a stored light sequence. Upon a determination by the processor 1405 the command is to run a stored light sequence, the processor 1405 activates 1550 the stored light sequence, and the method continues at step 1510 with the processor 1405 determining 1510 if a light sequence is active. Upon a determination at step 1545 by the processor 1405 the command is not to run a stored light sequence the method continues at step 1510 with the processor 1405 determining 1510 if a light sequence is active.

Figure 16:
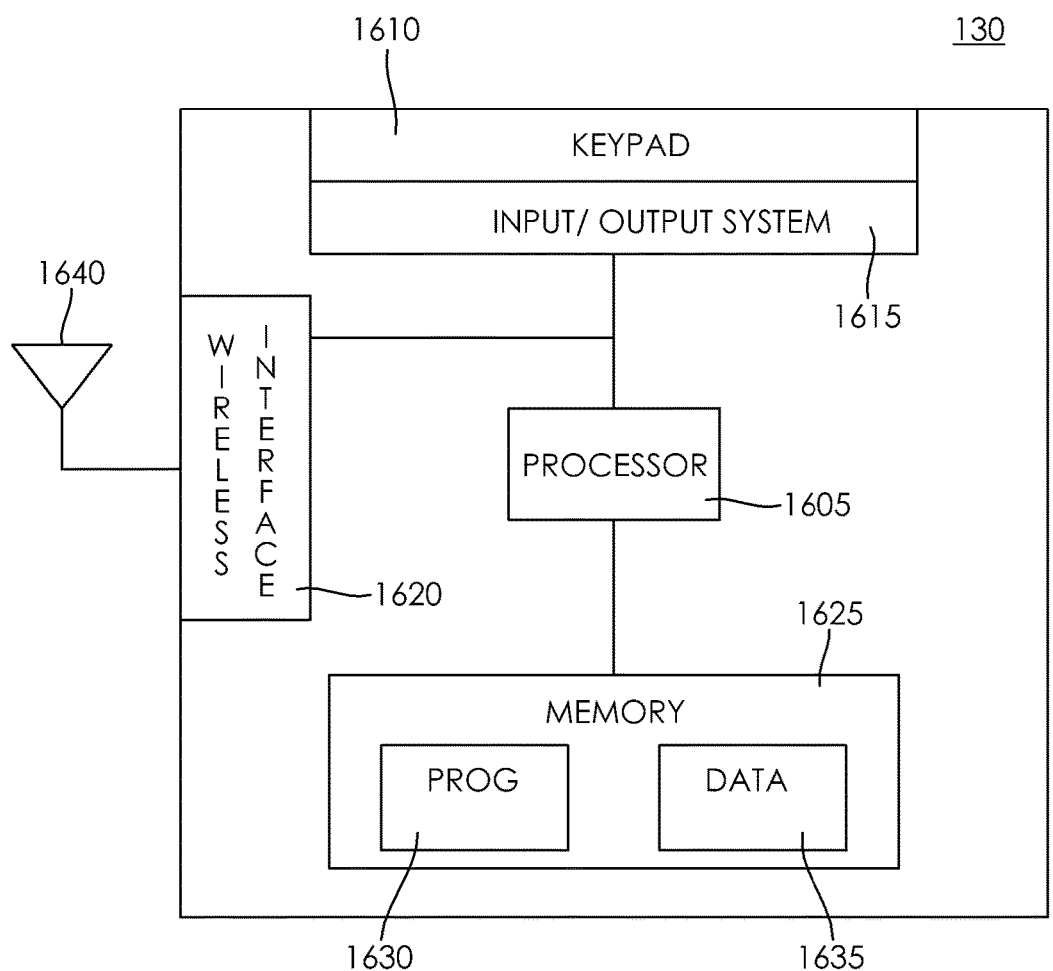
FIG. 16 depicts a structural view of an exemplary remote control.

FIG. 16 depicts a structural view of an exemplary remote control. In FIG. 16, an exemplary remote control 130 includes a processor 1605 that is in electrical communication with memory 1625. The depicted memory 1625 also includes program instructions 1630 and data 1635 adapted to send wireless control information to a controller, depicted in FIG. 14. In some designs, the program instructions 1630 and data 1635 may adapt the wireless control information to configure the controller to provide a user the capability of programming unique and individual color sequences and activating the color sequences by electrically energizing one or more light source. The processor 1605 is communicatively coupled to input/output system 1615 and keypad 1610 to receive input and provide output. The processor 1605 is configured to communicate with a wireless network via wireless interface 1620 and antenna 1640. In some examples, the processor 1605 may be configured to communicate with wireless networks or wireless devices via other interfaces. For example, in some designs, the remote control may include a Bluetooth interface. In some embodiments, the remote control may include an ultrasonic data interface. In some embodiments, the remote control may include a Wi-Fi interface.

Figure 17:
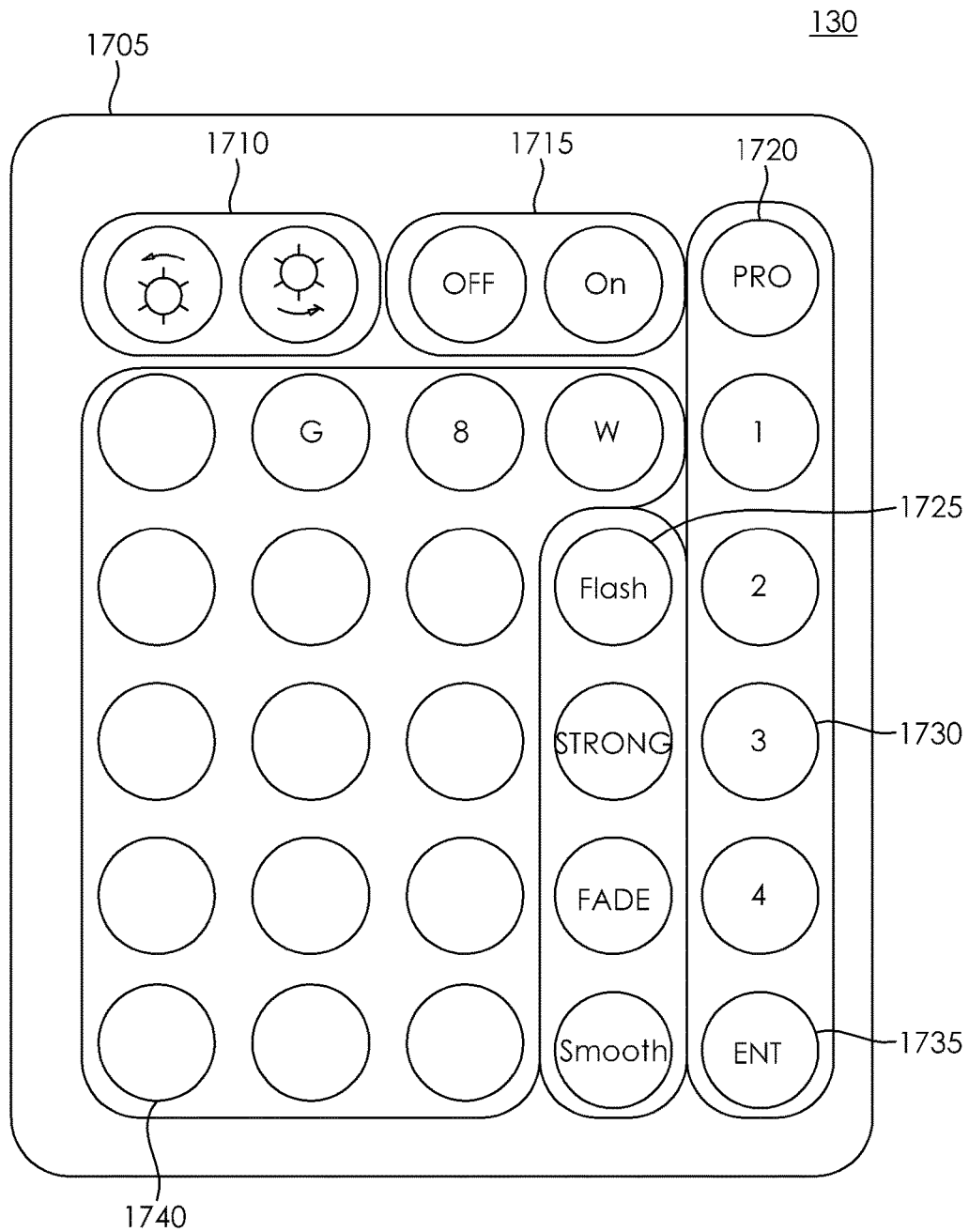
FIG. 17 depicts an exemplary user interface to an exemplary remote control.

FIG. 17 depicts an exemplary user interface to an exemplary remote control. In FIG. 17, an exemplary remote control 130 provides a remote user interface 1705 to a controller, depicted in FIG. 14. In some embodiments, Light Sequence Start/Stop 1710 activates or deactivates the currently selected Light Sequence. In various designs, Controller Power On/Off 1715 activates or deactivates the controller power supply. In some examples, Program Custom Sequence 1720 enables a user to input a custom light sequence on Light Sequence Selectors 1740. In some examples, Pre-programmed Sequence Selector 1725 enables a user to select a factory programmed sequence as the currently selected sequence. In various implementations, Programmed Sequence Selector 1730 enables a user to select a previously entered custom sequence as the current sequence. In various designs, Activate Sequence 1735 activates the currently selected sequence in the controller.

Figure 18:
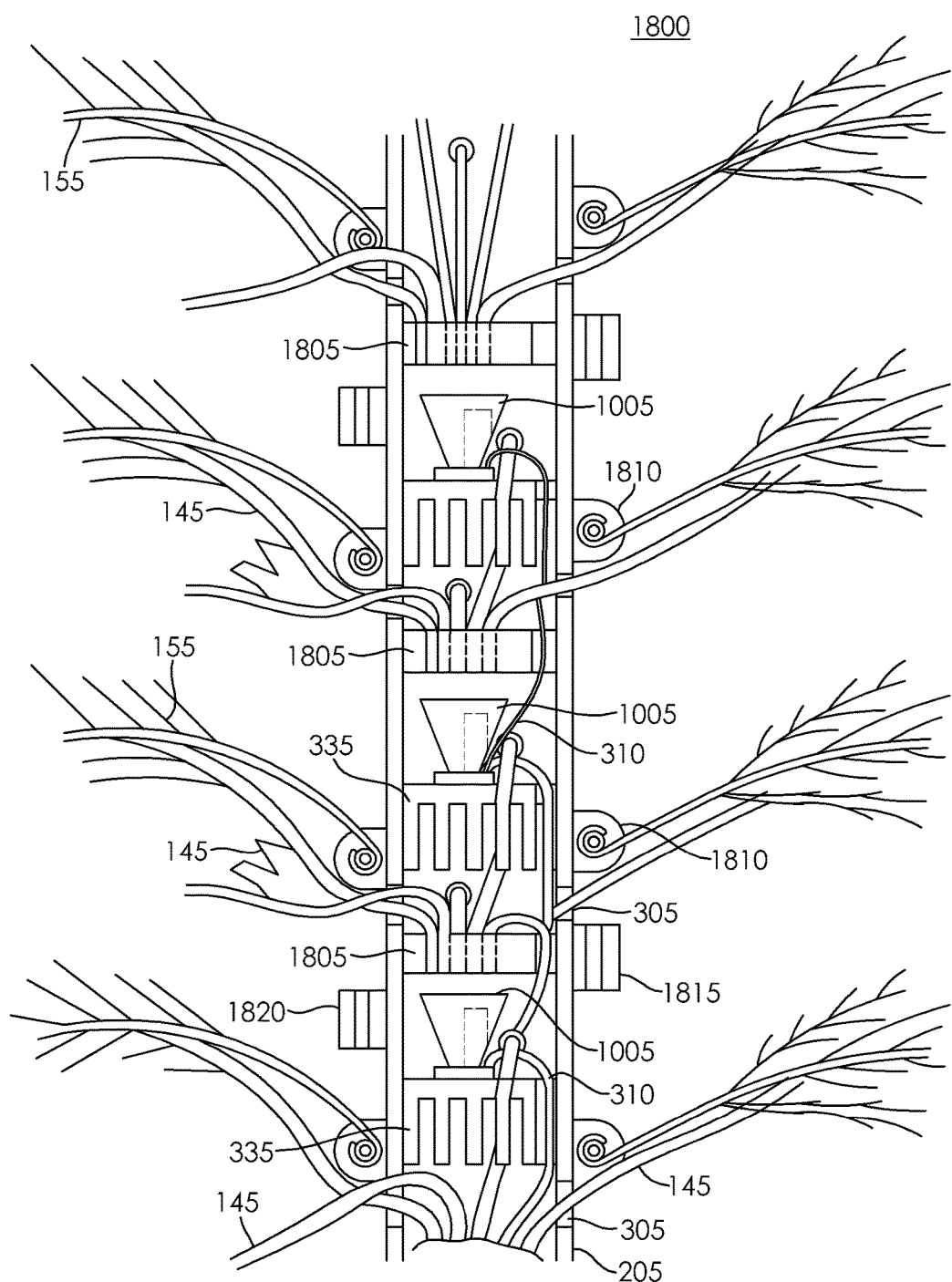

FIG. 18 depicts an exemplary trunk section of a Multi-level LED fiber optic tree having the bulb and fiber optic bundles disposed to one side in the trunk tube to provide space for the wiring to pass through. In FIG. 18, an exemplary Multi-level LED Fiber Optic Tree Assembly 1800 is illustrated as having bulb leads 310 and fiber optic bundles 145 disposed to one side in the trunk tube 205 to provide space for the wiring and fiber to pass through the trunk tube 205. The additional free space in trunk tube 205 provides more air flow to increase the effectiveness of the heat sink 335 to cool the depicted light source multi-3 color LED housing 1005. In the illustrated embodiment, fiber optic bundle epoxy block 1805 secures the fiber optic bundle 145 exiting tree branch 155 via fiber optic bundle exit slot 305. The tree branch 155 is secured by branch support 1810. Each of the trunk tubes 205 are secured to at least one other trunk tube 205 by one or more of joiner block upper 1815 and joiner block lower 1820.

Figure 19:
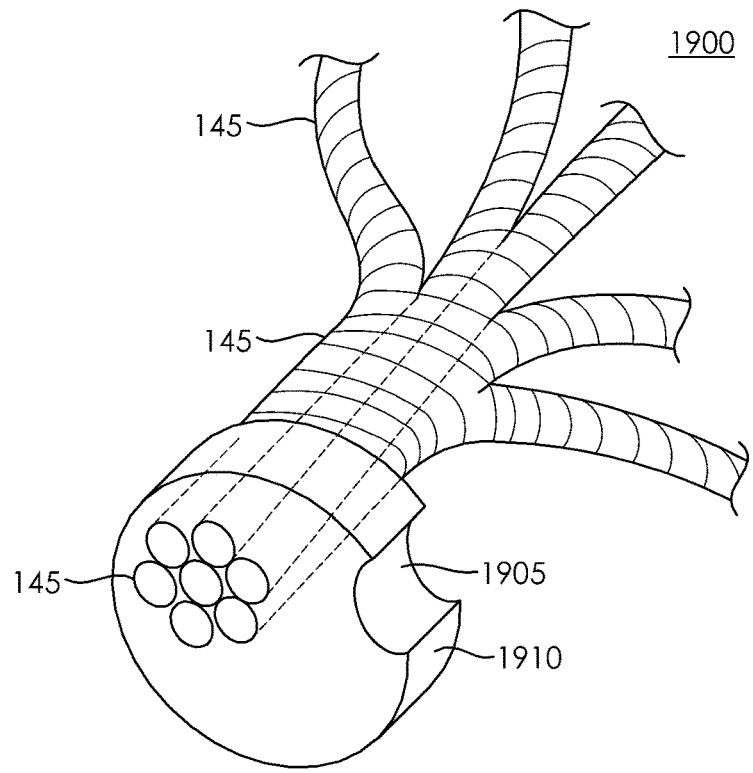

FIG. 19 depicts an alternative embodiment trunk section of a Multi-level LED fiber optic tree having the bulb and fiber optic bundles disposed to one side in the trunk tube to provide space for the wiring to pass through. In FIG. 19, the base section of an exemplary Multi-level LED Fiber Optic Tree Assembly 1900 is illustrated as having fiber optic bundles 145 disposed to one side to provide space for the wiring and fiber to pass through. The wire relief notch 1905 provides free space for wiring to pass through in assembly. Fiber optic bundle epoxy block 1910 provides a surface to which the fiber optic bundles 145 may be secured in assembly.

Figure 20:
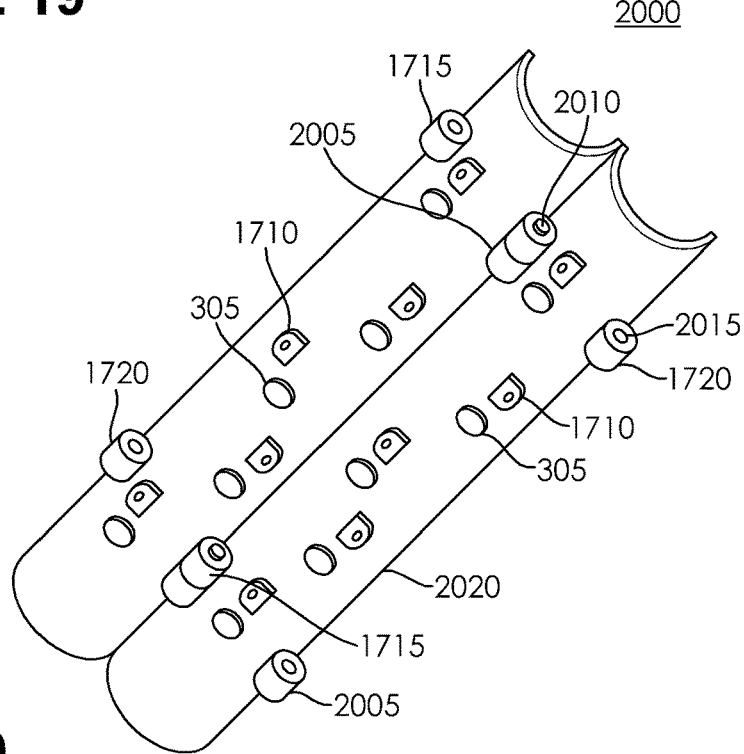
FIG. 20 depicts an exemplary trunk tube divided into rotationally movable halves to enable assembly of the trunk tube by inserting fiber optic bundles in one half and securing the other half.

FIG. 20 depicts an exemplary trunk tube divided into rotationally movable halves to enable assembly of the trunk tube by inserting fiber optic bundles in one half and securing the other half. In FIG. 20, an exemplary multi-level LED fiber optic tree movable divided trunk tube assembly 2000 is illustrated. The divided trunk tube assembly is rotationally movable via a hinge formed by welded joint 2005 coupled by joiner pin 2010 to pin hole 2015. Each half trunk tube 2020 retains a branch support 1810 and optic bundle exit slot 305 to facilitate the assembly of a fiber optic tree from multiple half trunk tube sections 2020. Each of the half trunk tubes 2020 may be secured to at least one other trunk tube 2020 by one or more of joiner block upper 1815 and joiner block lower 1820.

Figure 21:
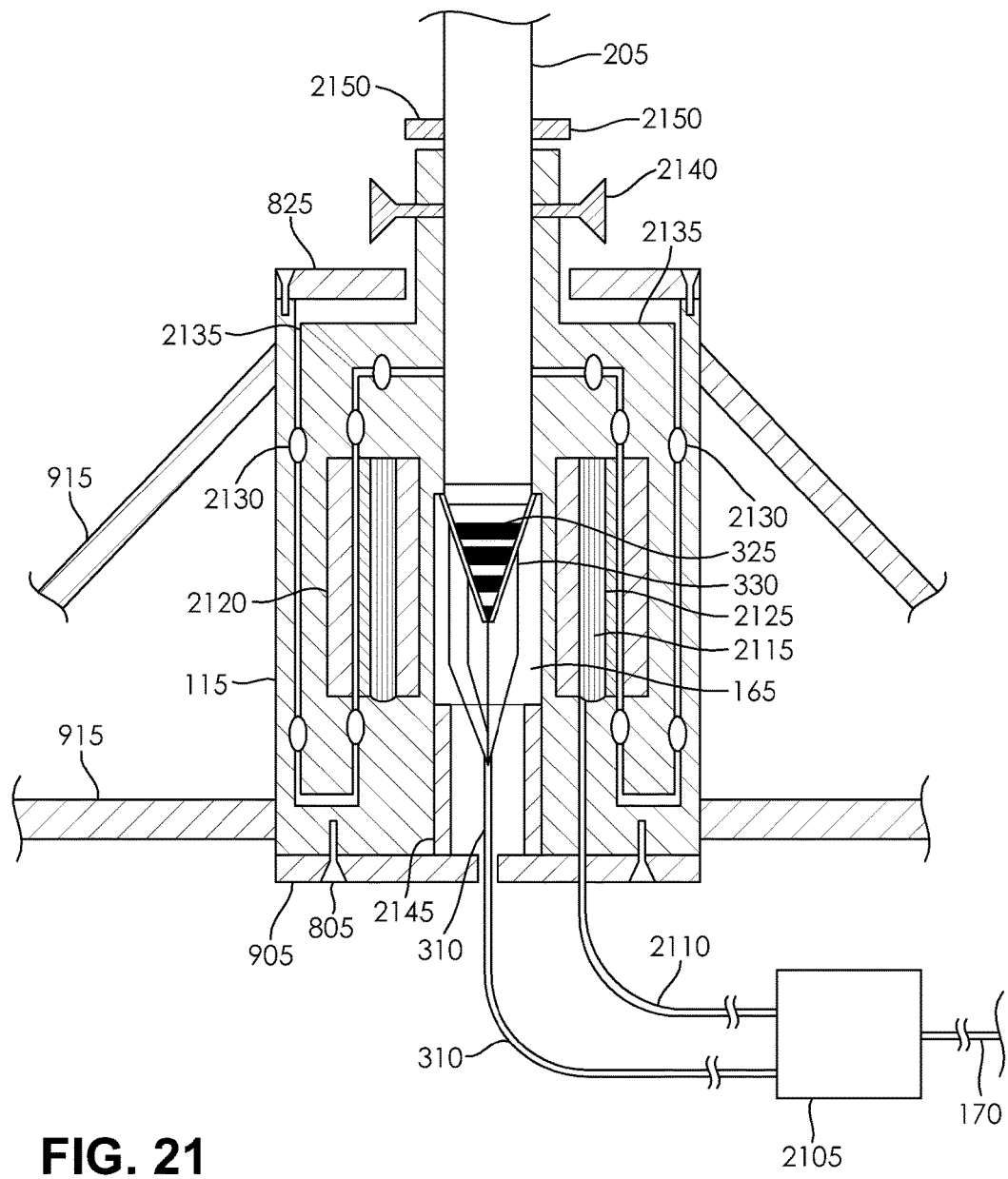
FIG. 21 depicts an exemplary motorized base assembly configured to rotate an embodiment fiber optic tree.

FIG. 21 depicts an exemplary motorized base assembly configured to rotate an embodiment fiber optic tree. In FIG. 21, the exemplary motorized base assembly 2100 is configured in the tree stand 115 to rotate trunk tube 205. The power connection 170 supplies electrical energy to the motor and LED control box 2105. In the depicted embodiment, bulb leads 310 electrically connect female connector 165 to the motor and LED control box 2105. In the illustrated embodiment, the female connector 165 electrically connects and rotationally couples the trunk tube 205 through contact ring 325 and contact terminal 330. In the illustrated embodiment, the motor leads 2110 electrically connect the motor and LED control box 2105 to the motor windings 2115 to energize the permanent magnet 2120 and electromagnetically engage motor pole 2125 to rotationally drive the trunk tube 205. In the depicted embodiment, the trunk tube 205 is mechanically coupled by bearing 2130 to the rotating body 2135. In the depicted embodiment, tree securing thumb screws 2140 secure the trunk tube 205 to the rotating body 2135. In the illustrated embodiment, the socket securing cylinder 2145 rotationally secures the bottom of trunk tube 205 in the motorized base assembly 2100. Lower securing screw 805 secures the bottom of the motorized base assembly 2100 to horizontal plate 905. In the depicted example, top hold down plate 825 horizontally secures the trunk tube 205 in the motorized base assembly 2100 which is supported by base legs 915. In the depicted embodiment, the tree trunk collar 2150 rotationally secures the top of trunk tube 205 in the motorized base assembly 2100.

Although various embodiments have been described with reference to the Figures, other embodiments are possible. For example, there have been Fiber Optic trees lit by a single halogen light bulb with color wheels to produce changing light displays or a single Led in a housing at the base of the tree. For Fiber optic decorative products, the height and illumination brightness are limited by the optical losses within the plastic fiber optic material, and therefore a limitation to the effective acceptable height of the decorative display item or trees. Additionally, the halogen bulbs and color wheel motor are relatively high energy users.

Therefore, a need exists for a fiber optic tree that uses a number of Multicolored LED bulbs each of which supplies a limited length number of optic fibers associated with each LED bulb. This arrangement provides acceptable brightness to all fibers for tall trees or larger decorations. The use of a few LED bulbs reduces the amount of energy consumed to achieve acceptable brightness. Some trees have been made with light sources on the upper part of a tree but they require external wires and external connectors and have the upper fiber light sources in bulky, unattractive housings part way up the tree.

Various embodiments may provide the ability to have a consistently bright fiber optic tree of tall heights with reduced energy consumption, because of the unique construction and electrical system employed. This invention describes the method of housing the multicolored LED bulb or bulbs within the trunk of the tree section such that each tree section has its own light source for its respective fiber optic strands or bundles of strands. Additionally, the primary light sources are contained within the tree trunk with electrical connections also internal to the tree trunk. Further, these connections may contain a safety feature that does not provide a complete circuit until the male connector is inserted. Additionally, the construction of the connectors in the trunk sections to turn without losing contact. Some embodiments may provide the ability to rotate a Fiber Optic tree while maintaining the multiple sequences and lighting patterns on the LEDs and fiber optic tips.

Various examples may include a single housing of multiple multi-LED bulbs providing separate reflectors that provide the fiber optic bundles or fibers with individual colors from the individual LED reflectors. In some designs, a fiber optic tree may be composed from multiple sections, with the tree sections having fiber optic bundles and fibers internal to the tree, which exit the tree to display the color patterns at the end of their fibers, with the multiple bulb LED internal to the tree trunk and electrical connectors supplying the needed current to each section, with the power and control circuits in separate housings.

In an illustrative example, a male connector may supply electrical power to the light source through the bottom of a trunk section, with a multi-bulb LED above the connector, a heat sink in contact with the metal tree trunk tube, and the fiber optic bundles above the LED. In some embodiments, a female connector may be located at the top of each tree section, with the electrical leads for the next section connected to terminals and insulators that can be positioned angularly around the connector in such a way to allow the electrical separation of the terminals one from another both vertically and rotationally, to allow for many terminals within the connector. Various designs may include a female connector with a safety terminal at the bottom of the tree section, wherein the bottom contact is not connected to its respective power source until the male bottom contact terminal pushes the spring terminal down to complete the circuit in the female connector and bringing current into the male terminal of that common return circuit. Some embodiments may include a female connector within the top of the tree stand to provide electrical current to the male contacts in the tree section that powers the multi-bulb LEDs in the trunk sections. In various examples, in addition to a bottom male connector of a tree section and the top female section of the tree segments, a tree section may also include a female connector "pig tail" for other similar individual display LED items. In some designs, male and female connectors may electrically connect and rotationally couple a tree section to another tree section, such that the interconnected tree sections may rotate without losing power to the interconnected tree sections.

In various examples, illumination of LEDs may be facilitated through 4 leads to the LED housing for the multiple LEDs in the same housing, however a single housing may contain multiple individual reflective segments each containing multiple of LEDs. In some designs, a fiber optic base may include a multi-LED bulb in the base and the LED at the top of each trunk section, with the electrical connections external to the section joints, and a reinforced base structure to support a tall multi-section fiber optic tree. In some embodiments, a single bulb housing may include multiple multi-LED bulbs and reflectors to provide individual colors into the individual fiber optic bundles directly mounted above the multi bulb housing.

In some designs, a remote control may provide a signal to a control circuit within the fiber optic control CPU that provides for the acceptance of individual user programmed color sequences into individual numbered memory locations to be replayed in the LED lights on demand.

Some designs may include LED illumination bulbs housed within each trunk section, illuminating the one end of fiber optic fibers that exit the trunk into the branches.

Various examples may connect power for the individual LEDs in the first section of the tree trunk via a female connector in the base of a tree stand.

Some embodiments may provide power for each trunk section with its LEDs and Fiber optic strands via a male connector in the bottom of the section which feeds the power to the LEDs above the connector.

In some embodiments, LEDs in each trunk section may be cooled by a heat sink that the LEDs are mounted on that in turn is physically in contact with the metal of the tree trunk tube.

In various examples, electrical controls and power for a Fiber Optic LED tree may be in a separate housing external to the Fiber Optic Base.

In some designs, a center contact in each female connector that supplies the common return current conductor may have a terminal that is not electrically connected until the male center terminal is inserted into the female connector forcing the female contact to be depressed and make contact with its supply circuit.

Some embodiments may be configured with a single housing containing multiple reflector surfaces reflecting the light and individual colors form their respective multi-LED bulbs.

Various examples may include a structure surrounding a Fiber Optic base to provide a more secure structure for tall fiber optic trees.

Some embodiments may include a program within the CPU/memory of the Fiber Optic controls accessible and programmable by the remote control, to provide the user the capability of programming unique and individual color sequences (as example Red, White, Blue for US national holiday).

In various embodiments, LEDs are mounted in each trunk section, thereby allowing the sections to be stacked one on top of another to any height desired. In some designs, each trunk section has its own connectors at the bottom and top to provide instant electrification and therefore illumination upon plugging in as in the Power Connect/Safety grounded tree. Because the connector in various examples may have a conical male and female connection with ring contacts, it can be seen in some designs, that based on final construction the tree could rotate in its socket and maintain electrical contact. In some embodiments, a motorized base may be provided to rotate the tree in the tree stand. In various designs, electric controls adapted to the size and weight of the tree provide the speed and torque needed for the motorized base to rotate the tree in the tree stand.

Various examples may be configured with a single LED bulb housing with one or more LEDs in each housing. In various implementations, multiple LEDs may be included at multiple levels within each trunk section, adding more illumination power and or more colors and color pattern variations to each tree section and therefore the tree itself. In some examples, the variation of multiple LEDs per trunk section may reduce the quantity of fiber optic bundles needed. In an illustrative example, fewer fiber optic bundles in the trunk tube frees up space to allow the bulb and fiber bundles to be disposed to one side in the trunk tube to allow for the wiring to more easily be placed during manufacturing assembly.

In various designs, a trunk tube may be divided into two halves lengthwise to allow the parts and fiber optic bundles inserted and secured in one half and then the other half placed on top of the first half and secured. In some examples, the trunk tube halves may be rotationally movable to enhance the ease of manufacturing assembly. In various designs, the trunk tube halves may be rotationally movable via coupling by a hinged arrangement.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A lighted tree, comprising:
   at least one trunk section configured with a connector disposed on at least a first end of the trunk section and adapted to electrically connect and rotationally couple the first end of the trunk section to an adjacent section of the lighted tree;
   a light source retained within an interior portion of the trunk section and electrically connected to the connector, wherein the interior portion is defined by a wall that forms the trunk section; and
   a light transmitting element having a first end optically coupled to the light source and a second end external to the tree trunk section that emits light, wherein the light transmitting element exits the interior portion of the trunk section through an opening formed in the wall of trunk section.

2. The lighted tree of claim 1, further comprising a plurality of branch segments extending from at least one trunk section, wherein one or more of the branch segments are adapted to receive and support the second end of the light transmitting element after the second end of the light transmitting element exits the trunk section.

3. The lighted tree of claim 1, further comprising a base section adapted to electronically connect and rotationally couple with a lowermost trunk section, wherein the base section is a stand configured to support the lighted tree.

4. The lighted tree of claim 3, in which the base section further comprises a motor adapted to rotate the lighted tree.

5. The lighted tree of claim 1, further comprising a remote control that is configured to provide a signal to the control unit for the selection or programing of a light activation sequence.

6. A lighted tree, comprising:
   at least one trunk section configured with a connector disposed on at least one end of the trunk section and adapted to electrically connect and rotationally couple the end of the trunk section to an adjacent section of the lighted tree;
   a light source retained within an interior portion of the trunk section and electrically connected to the connector, wherein the interior portion is defined by a wall that forms the trunk section;
   a light transmitting element having a first end optically coupled to the light source and a second end external to the tree trunk section that emits light, wherein the light transmitting element exits the interior portion of the trunk section through an opening formed in the wall of trunk section;
   a plurality of branch segments extending from one or more of the trunk sections, wherein one or more of the branch segments are adapted to receive and support the second end of the light transmitting element after the second end of the light transmitting element exits the trunk section; and
   a base section adapted to electronically connect and rotationally couple with a lowermost trunk section, wherein the base section is a stand configured to support the lighted tree.

7. The lighted tree of claim 6, wherein the trunk section is a tree top section with the connector at only a bottom end of the tree top section and connecting to the lighted tree as a topmost of the tree sections.

8. The lighted tree of claim 6, further comprising a light source retained within an interior portion of the base section and electrically connected to the connector, and a light transmitting element having a first end optically coupled to the light source and a second end external to the base section that emits light.

9. The lighted tree of claim 6, in which the lighted tree further comprises a controller, the controller comprising:
   an electrical interface electrically connected to at least one connector in at least one trunk section and adapted to control a light source;
   an input/output system adapted to receive input and send output;

a processor operably coupled to the electrical interface and the input/output system; and a memory that is not a transitory propagating signal, the memory connected to the processor and encoding computer readable instructions, including processor executable program instructions, the computer readable instructions accessible to the processor, wherein the processor executable program instructions, when executed by the processor, cause the processor to perform operations comprising;

receiving, from the input system, a light activation sequence;

storing, in the memory, the light activation sequence; and activating, through the electrical interface, at least one light source based on the light activation sequence.

10. The lighted tree of claim 9, in which the controller further comprises an input/output system communicatively coupled to a user-controlled remote control providing the user the capability of programming a light activation sequence in the controller.

11. The lighted tree of claim 9, in which the light source is a multi-LED bulb, the multi-LED bulb produces multiple colors of light, the light source further comprises a plurality of reflectors optically coupling at least one color of light from a multi-LED bulb to a light transmitting element, and the controller is adapted to selectively activate individual colors of light in the light source.

* * * * *